United States Patent [19]

Fischer et al.

[11] Patent Number: 5,014,138

[45] Date of Patent: May 7, 1991

[54] PROCESS FOR RECORDING SEMIHALFTONE IMAGES AND DEVICE FOR CONVERSION OF IMAGE DOT TONAL VALUE DATA

[75] Inventors: Gerhard Fischer, Offenbach; Helmut Quabeck, Babenhausen, both of Fed. Rep. of Germany

[73] Assignee: E. I. Du Pont de Nemours and Company, Wilmington, Del.

[21] Appl. No.: 480,353

[22] Filed: Feb. 14, 1990

Related U.S. Application Data

[62] Division of Ser. No. 204,155, May 31, 1988, Pat. No. 4,939,589.

[30] Foreign Application Priority Data

Jun. 3, 1987 [DE] Fed. Rep. of Germany ....... 3718521

[51] Int. Cl.$^5$ .......................... H04N 1/23; H04N 1/46
[52] U.S. Cl. .................... 358/448; 358/456; 358/298
[58] Field of Search ............... 358/429, 448, 455, 456, 358/458, 459, 298

[56] References Cited

U.S. PATENT DOCUMENTS

| 4,075,663 | 2/1978 | Wellendorf | 358/283 |
| 4,482,923 | 11/1984 | Fischer et al. | 358/283 |
| 4,485,397 | 11/1984 | Scheuter et al. | 358/283 |
| 4,531,160 | 7/1985 | Ehn | 358/298 |
| 4,547,812 | 10/1985 | Waller et al. | 358/459 |
| 4,578,713 | 3/1986 | Tsao et al. | 358/456 |
| 4,876,611 | 10/1989 | Fischer et al. | 358/298 |
| 4,939,589 | 7/1990 | Fischer et al. | 358/456 |

FOREIGN PATENT DOCUMENTS 0132453 2/1985 European Pat. Off. .
2017960 10/1971 Fed. Rep. of Germany .
59-163959 9/1984 Japan ..

OTHER PUBLICATIONS

Karl R. Scheuter and Gerhard Fischer, "Frequency Modulated Picture Recording with Random Pixel Distrubtion" pp. 1-12.
Karl R. Scheuter and Gerhard Fischer, "Frequency Modulated Screening", Gate Technical Forum, 1985, pp. 1-13.

Primary Examiner—Edward L. Coles, Sr.
Assistant Examiner—Jerome Grant
Attorney, Agent, or Firm—John E. Griffiths

[57] ABSTRACT

The invention provides for deciding whether a recording dot is to be printed for the reproduction of scan dots. The scan dots being considered are complied in an input switching network into groups, for which an arithmetic processor determines the tonal value sum. The arithmetic processor emits a signal, if the tonal value sum exceeds a certain figure. The recording dot to be printed is determined by the presence of the signal in an output switching network. This process is performed successively for increasingly larger areas of the original, that is, for increasingly larger quantities of scan dots.

15 Claims, 12 Drawing Sheets

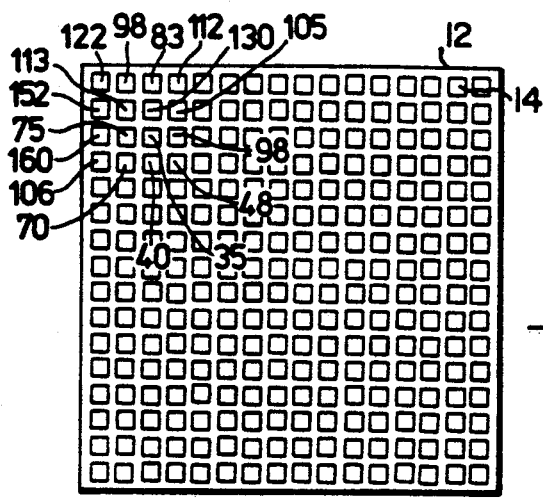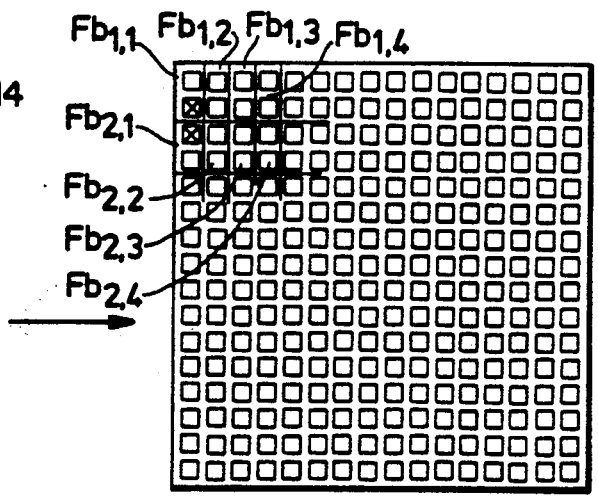
FIG.4A  FIG.4B
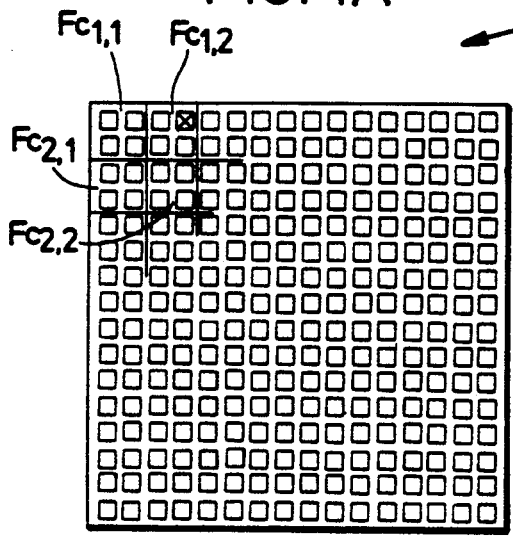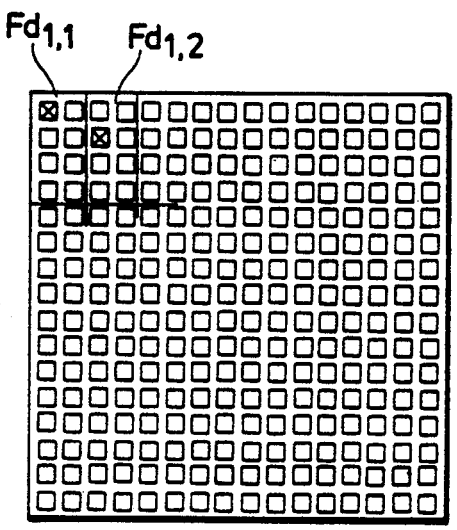
FIG.4C  FIG.4D
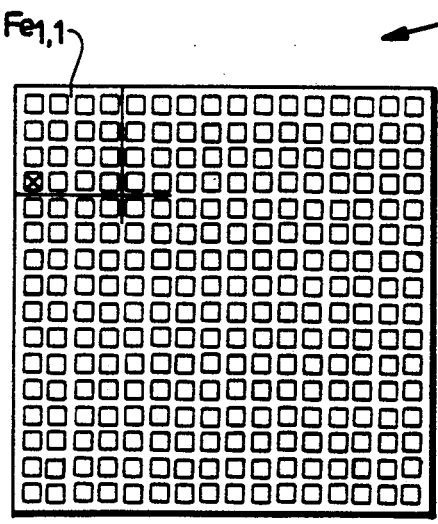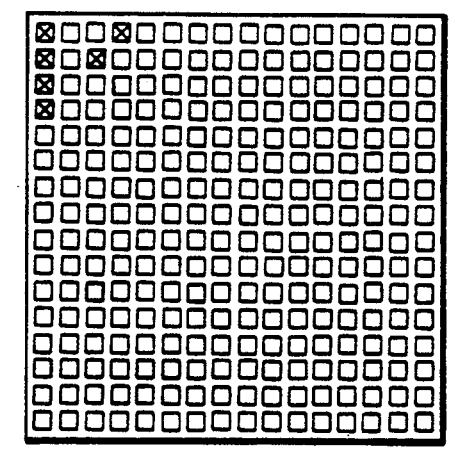
FIG.4E  FIG.4F

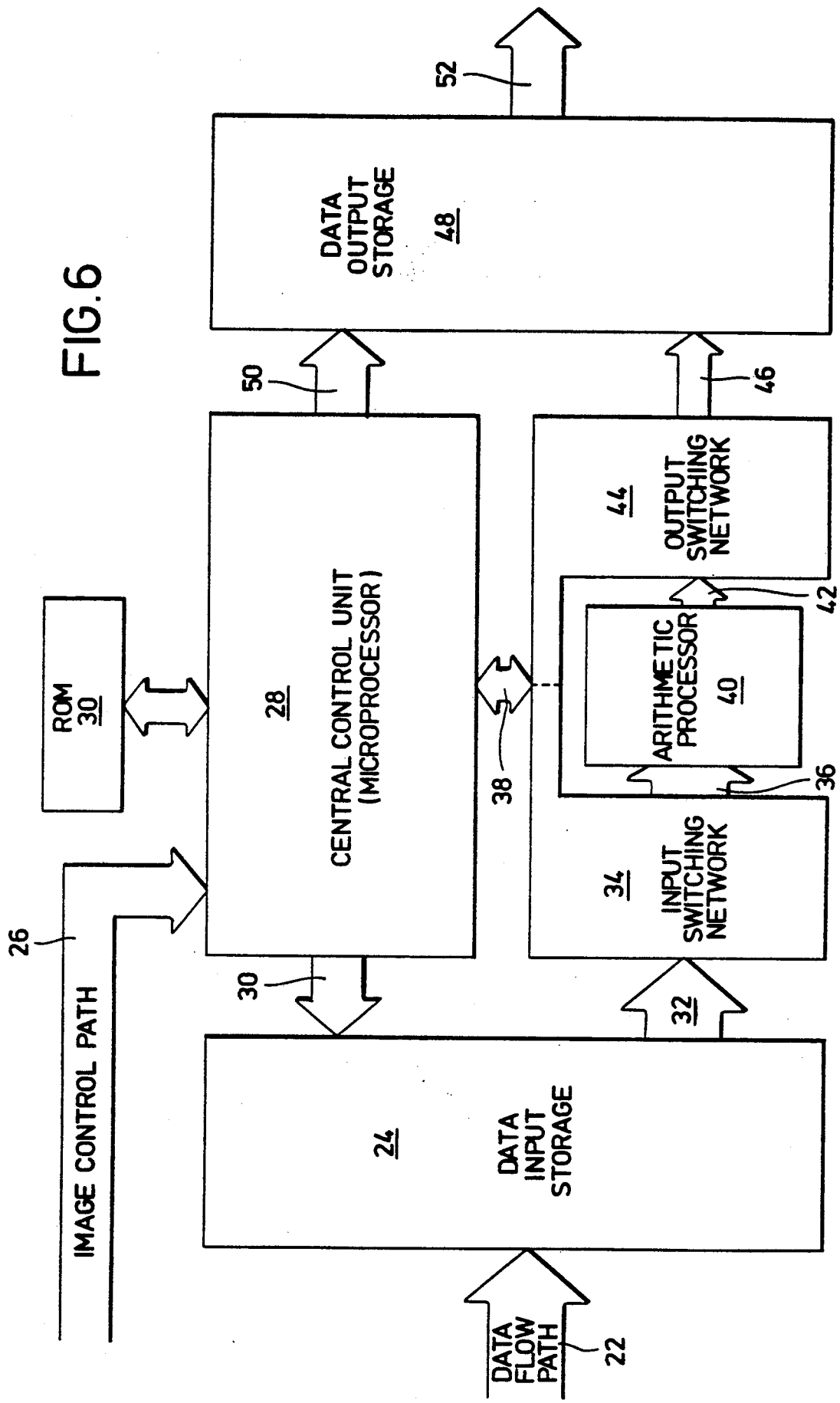

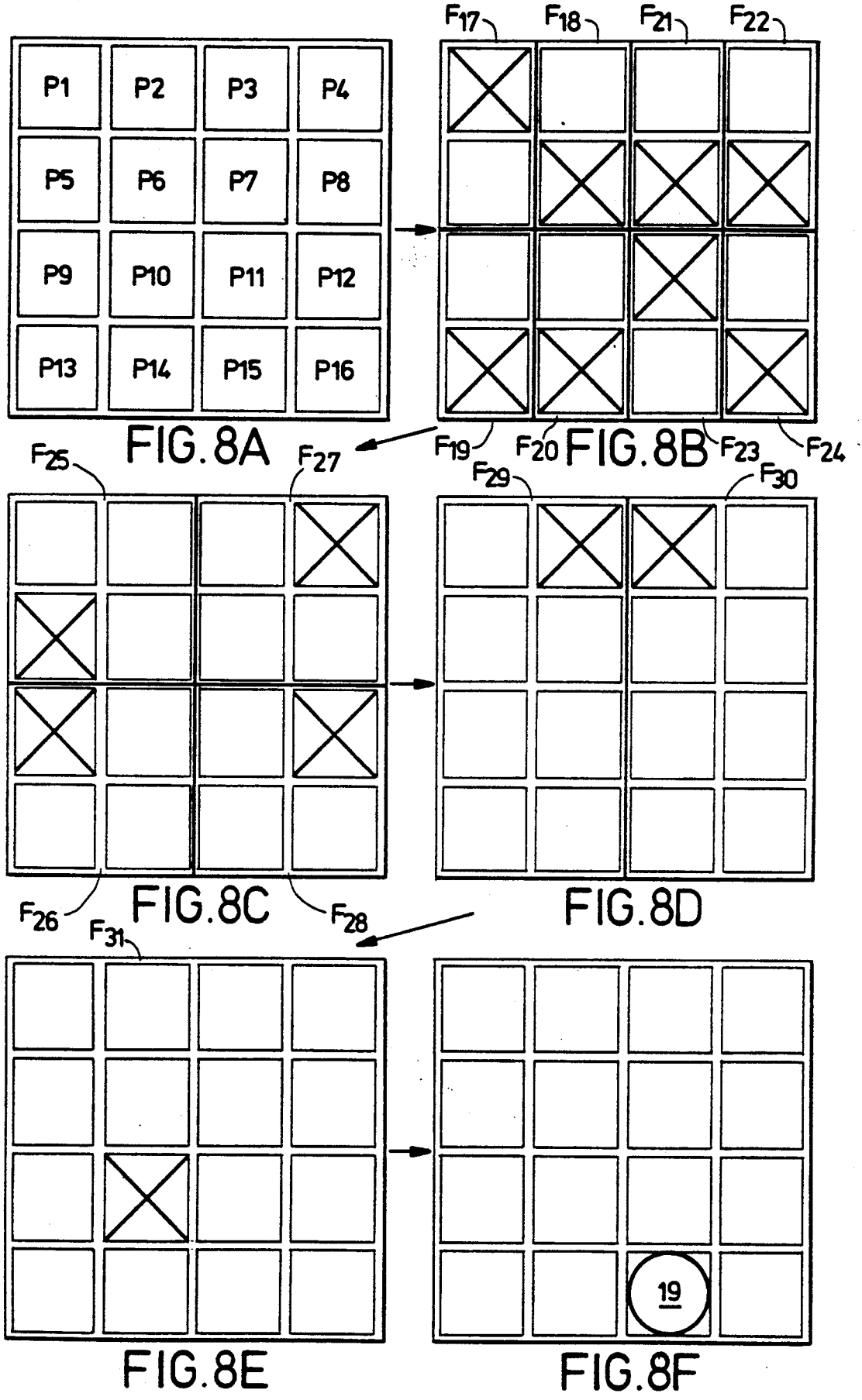

PROCESS FOR RECORDING SEMIHALFTONE IMAGES AND DEVICE FOR CONVERSION OF IMAGE DOT TONAL VALUE DATA

This is a division of application Ser. No. 07/204,155, filed May 31, 1988, now U.S. Pat. No. 4,939,589.

BACKGROUND OF THE INVENTION

1. Field of the Invention

The invention involves a process for recording semihalftone images. In this process, an original is reproduced on a recording medium by individual recording elements with the tone value "print" or "no-print". The original is divided into multiple scan fields comprising individual scan elements and each scan field is subdivided successively into the smallest subfield of a predetermined size.

2. Description of the Related Art

With this type of process, originals are reproduced on a recording medium, for example, a sheet of paper, a printing plate or a fluorescent screen, by means of individual equal size recording dots, which are either completely or not inked. In this process, the image information in the original is collected by a sensor or scanning device, for example, a scanner. For each image dot (scan dot), the scanner emits a signal, which corresponds to the tonal value (in color images, the color tone) of the scan dot. In a black and white original, the gray tones, which range from black to white, are realized on the recording medium by the frequency of the black recording dots being varied as a function of the desired gray tone. All recording dots in a black area of the original are black in the reproduction, while the proportion of white recording dots located among the black recording dots increases as the blackness decreases, that is, the frequency of the black recording dots is lower. In white areas of the original, all recording dots are white, that is not inked. In this way, the gray scale can be reproduced in multiple, discrete steps, that is, semicontinuously. This type of reproduced image is also referred to as a "semihalftone" image in which the tonal values of the tonal value scale are reproduced according to a pre determined subdivision into tonal value gradations.

The processing of such semihalftone images with the assistance of digital technique is very simple, because the image processing can proceed by the binary method ("1" or "L" for a print dot and "0" for a no-print dot). Thus, the semihalftone image corresponds to a binary record of the image information in an original, which, therefore, can be easily recorded on a storage medium, such as magnetic tape, a magnetic disk or a diskette, but also can be recorded, for example, in a semiconductor storage device.

Within the skill of the art, the word "recording" means any type of imaging of the original as a semihalftone image. This concept includes particularly the reproduction of the original on a sheet of paper or on a fluorescent screen, the preparation of a printing plate suitable for reproduction of the original and storing the image in a storage device.

A process for the binary recording of images is known from U.S. Pat. No. 4,578,713. In this process, an original is scanned linewise; the tonal value of each scan dot is determined and stored. The original is subdivided into multiple scan fields, each scan field comprises multiple scan dots, that is, the tonal value data for the scan dots of the original are subdivided into data blocks. The average tonal value of each data block is calculated from the appropriate tonal value data. From this is determined the number of recording dots required to reproduce the average tonal value. The distribution of the recording dots to be printed per scan field is determined by successive subdivision of the scan field into the smallest subblocks. For the smaller data blocks resulting from each subdividing step, the average tonal value and the number of related recording dots to be printed to yield this average tonal value is determined from the tonal values of the pertinent scan dots. The known process, in order to determine the number of recording dots to be printed within the subfields, begins with examining the scan field itself or the largest subfields respectively and continues by considering smaller and smaller subfields, until the scan field is finally subdivided into the individual scan dots. In addition to the determination of the number and the distribution of the recording dots to be printed, an error calculation must also be performed in each step. This becomes more and more costly with increasing subdivision, because the number of data subblocks increases from one subdivision step to another and quadratically at that. Because of these ever-increasing error calculations, the advantages of digital image processing are diminished.

SUMMARY OF THE INVENTION

The invention is based on and solves the problem of developing a process for the digital recording of originals of the aforesaid type, which process can be operated without consideration for errors.

In accordance with the present invention, there is provided a process for recording semihalftone images, in which process an original is reproduced on a recording medium by individual recording elements with a tone value of "print" or "no-print", the original is divided into multiple scan fields comprising individual scan elements and each of the scan fields is subdivided successively into higher order subfields and then into smallest subfields of a predetermined size, characterized in that, for each one of the smallest subfields as well as for each of the higher order subfields to which the one smallest subfield belongs, an average value is determined or estimated from the tonal values of the scan elements in the subfield being considered, and in that at least one of the recording elements assigned to the subfield being considered is printed in a position of the subfield being considered, if the average value is greater than a predetermined reference tonal value.

Written another way, there is provided a process for recording three dimensional semihalftone images, in which process an original is reproduced three dimensionally on a recording medium by individual recording volume elements with a tonal value of "print" or "no-print", the original is divided into multiple scan volumes comprising individual scan volume elements and each of the scan volumes is subdivided successively into higher order subvolumes and then into smallest subvolumes with a predetermined volume characterized in that an average value for each of the higher order subvolumes, to which the smallest subvolumes belong, is determined or estimated from the tonal values of the scan volume elements in the subvolumes being considered, and in that at least one of the recording volume elements assigned to the subvolume being considered is assigned the tonal value "print", if the average value is greater than a predetermined reference value.

The invention is further directed to apparatus for the conversion of image dot tonal values with processing unit, which converts tonal values of an original, which is subdivided into multiple scan fields, into recording image dot data, which corresponds to a tonal value of "print" or "no-print", characterized in that the processing unit consists of:

an input switching network adapted to receive image dot tonal value data and to compile the data into data blocks corresponding to a subdivision of the scan fields of the original into subfields, an arithmetic processor connected with the input switching network, the processor adapted to emit an output signal for each one of the blocks when an average tonal value of the one block is greater than a predetermined reference value, and an output switching network connected with the arithmetic processor, the output switching network adapted to plot the recording image dot data or the distribution of the recording image dot data corresponding to the tonal value "print" and to the tonal value "no-print" as a function of the output signals of the arithmetic processor.

BRIEF DESCRIPTION OF THE DRAWINGS

Examples of embodiments of the invention are explained in the following in more detail with reference to the figures. In detail, the figures show:

FIGS. 4a to 4f—an example for the recording of a two dimensional original in accordance with a second embodiment of the present invention.

FIG. 6—a block circuit diagram of a device for converting image dot tonal values into binary data signals.

FIG. 8a to 8e—an example for the division and distribution of the recording dots to be printed for a scan field comprising 4×4 scan dots.

DESCRIPTION OF THE PREFERRED EMBODIMENT(S)

Figure 1A:
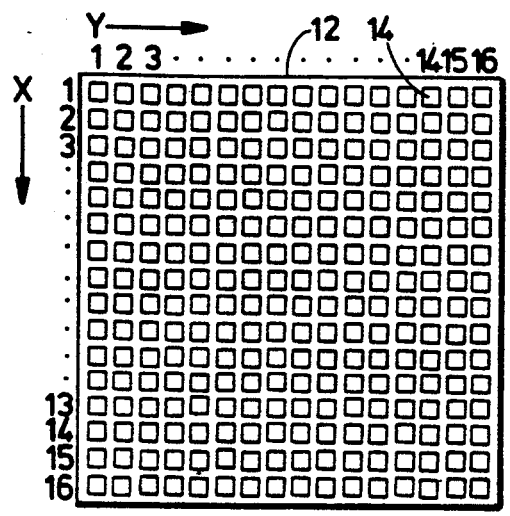
FIGS. 1a to 1i—an example of the subdivision of a scan field into individual subfields, that is, the subdivision of the (principal) data block, containing the tonal values of the individual scan dots of a scan field, into the individual data subblocks.

FIGS. 1a to 1i present the individual subdividing steps for recording a two dimensional image for the case wherein the scan definition is equal to the recording definition. This means that one scan dot of the original is reproduced by one recording dot on the recording medium. For clarity, the scan and recording dots respectively are represented by quadratic fields separated from each other. In actuality, the scan and recording dots are circular. Furthermore, it is assumed, for the sake of simplicity, that the original to be recorded is a black and white image. In this case, the tonal value of a scan dot corresponds to a specific gray tone (gray step) between the "gray values" of black and white.

The original to be recorded is scanned linewise in a scanning device, such as, for example, a scanner, an electronic camera, in which the image scan signals (the signals for the individual scan dots) show a good signal/noise ratio (for example, >100:1 in voltage amplitudes). The signal produced by the scanning device for each scan dot represents the (analogous) tonal value of the pertinent scan dot. These signals are digitalized in an analogue/digital converter and then stored so that they are always available during the entire process. Further calculations are conducted with a computer. The original is reproduced or represented on the recording medium of a recording apparatus, for example, on a sheet of paper, a printing plate or a fluorescent screen, by individual dots (recording dots). The recording apparatus receives the signals required for the recording from the computer.

The original is first subdivided, as shown in FIG. 1, into scan fields 12, which consist of multiple scan dots or elements 14 arranged in the form of a matrix. FIG. 1a shows the coordinates X and Y, which assist in giving the position of a scan dot 14 in the matrix. The same system of coordinates applies to the matrix of the recording dots 16 (FIG. 2). In the reproduction of the original on the recording medium, thus, in the copy of the original, it is important that the average tonal value of a scan field (that is, the average value of the tonal values of all scan dots 14 of a scan field 12, be reproduced as accurately as possible by the recording dots). About 150 tonal value steps (gray steps) can be distinguished by the human eye, so that, to present these tonal value steps, each scan field 12 of the original should be represented by at least 150 equal size recording dots on a recording medium. An individual recording dot can assume only the tonal value "print", that is, black, or the tonal value "no-print", that is, white. By variation of the number of recording dots to be toned or black within an area comprising at least 150 recording dots, the various gray value steps between white and black can be realized.

The digital technique currently used for image processing suggests that the gray scale be subdivided into 256 steps. The 256 gray steps can be represented on the recording medium by 256 recording dots or elements 16, which are arranged in a matrix of 16 rows and 16 columns. This means that a scan field 12 of the original is reproduced on the recording medium by 156 recording dots arranged in a matrix. The average tonal value of a scan field 12 can thus be reproduced almost exactly with an accuracy of $1/256=1/28^8$.

For the reproduction of the average tonal value of a scan field 12, the analogue signal produced by the scanning device for each scan dot, which signal represents the (analogue) tonal value of the pertinent scan dot, is digitalized in an eight bit analogue/digital converter with 256 signal stages. With the eight bit binary code, the (continuous) gray scale of the original—in the case of a black and white original—can be subdivided into 256 gray steps. The subdivision of the gray scale is so fine, that the human eye observing a scan field can hardly or not distinguish the difference between two gray values. The continuous gray scale of the original can be reproduced semi-continuously in the recording.

The process now converts 256 scan signals with 256 respective signal steps into 256 binary recording signals and indeed, with adequate quality from the standpoint of tonal value and detail reproduction.

In the case of the lightest tonal value (step 0), no recording dot will be printed and in the case of the darkest tonal value (255), correspondingly all of the 255 dots obtained above will be printed. What happens to the 256th dot (designated in FIG. 2a by the reference number 18) is unimportant, because the normal vision state of the human eye cannot recognize very small tonal value differences in dark tonal value areas. Therefore, the 256th dot was well as the 255th, thus, so to speak, together as a "double dot", can be processed or not used al all, that is, never be printed.

Obviously, only one binary recording dot 16 can be assigned for each individual scan dot 14, so that the tonal value of the binary recording dot is usually recorded, that is, printed, too high or too low, that is, not printed. However, if dotwise image modulation is ignored and instead, surfaces that consist of multiple image dots, are considered, progressively finer tonal value steps are obtained with enlarging surfaces. The desired fine tonal value gradation (256+1 steps) is obtained only for the entire recording surface comprising 256 image dots. This suffices, because, with 20 μm dots, the entire recording surface (comprising 156 image dots) is still so small (lateral length about 16×20 μm=320 μm=0.32 mm) that it is just perceptible visually at normal vision distance (30 cm). A good TV monitor can serve as comparison, its image dot, in HDTV technology, showing similarly up to eight bit tonal value gradation, at a luminous dot spacing of about 0.30 mm. Whereas the recording dots in the printed image are contiguous, the luminous dots of the monitor are separated from one another, which, however, is not perceptible. The process is characterized in that the limited performance capability of the human eye is frequently used most suitably to make possible a simple technical solution.

While FIG. 1 shows an example for a possible subdivision of scan field 12 into interconnected subfields, FIG. 2 shows which of the recording dots 16 belonging to a subfield are printed, if the average tonal value of the recording dots 14 located in this subfield exceeds a given reference value. The recording dots to be printed are represented by "x". The subdivision shown in FIG. 1 is obtained, if the scan field 12 shown in FIG. 1a is first subdivided into two equal size halves $Fh_1$ and $Fh_2$ (FIG. 1h), the two halves are subdivided again into two equal size halves $Fg_{1,1}$, $Fg_{2,1}$, and $Fg_{1,2}$, $Fg_{2,2}$ (FIG. 1g) and so on. Thus there is a successive subdivision of scan field 12 into two halves, four quarters, eight eighths and so on, until finally, after seven subdivisions there are 128 smallest subfields $Fb_{i,j}$, with i=1, 2, ..., 8 and j=1, 2, ..., 16, which consist of two scan or recording dots and constitute respectively 1/128 of the total surface of the scan field. The scan field 12 is then subdivided into multiple interconnected subfields of different sizes. This means that the tonal value data of the scan dots 14 of the scan field 12 are distributed to multiple interconnected data blocks of various sizes. The distribution shown in FIG. 2 of the recording dots to be printed as a function of the average value of each subfield represents only one example. There are innumerable possibilities for the location of the recording dots potentially to be printed per subfield. However, it is necessary to take care that a recording dot potentially to be printed in a larger subfield does not coincide with a recording dot potentially to be printed within a smaller subfield. This means that, in the superimposition of the pattern, shown in FIG. 2, of recording dots 16 to be printed, all recording dots but one are toned. With the aid of the example shown in FIG. 3, the following illustrates when and at what position a recording dot 16 is printed as a function of the tonal values of the scan dots 14.

For the example, it is assumed that the original should be reproduced in an equivalent shade. This means that a scan field, which shows an average gray value of, for example, 150, is also reproduced with a gray value of 150 on the recording medium. Thus, 150 recording dots 16 corresponding to scan field 12 must be black. If the original and the reproduction should be of equivalent shade, the reference value, above which the average value of the tonal values of scan dots 14 of a subfield must lie so that one recording dot 16 of the subfield is printed, is equal to the average tonal value that can be represented with 255 recording dots per scan field, that is, 127.5 (note that, for 256 gray tones from 0 to 255, only 255 of 256 recording dots are needed, so that one recording dot per scan field is not needed and instead, can be white). Advantageously, the reference value corresponds to the gray tone 128, which will be explained later.

Figure 2A:
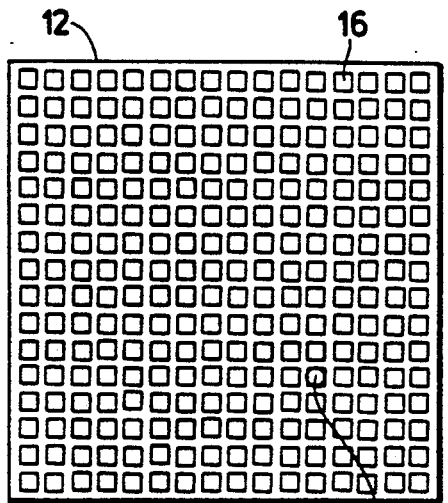
FIGS. 2a to 2i—recording dots that can be printed as a function of the magnitude of the average value of the tonal values of the individual subfields.
Figure 2B:
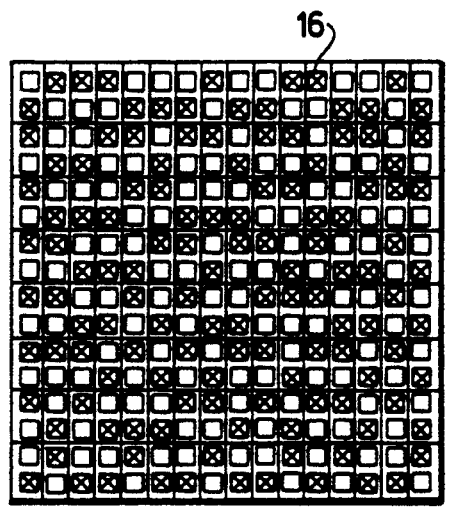
Figure 3A:
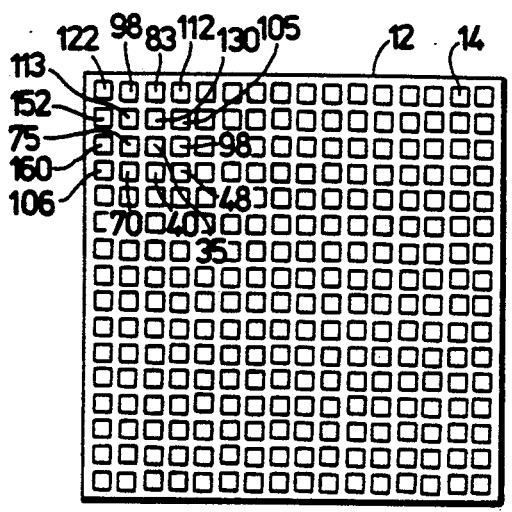
FIGS. 3a to 3f—an example for the recording of a two dimensional original with scan definition equal to recording definition in accordance with a first embodiment of the present invention.
Figure 3B:
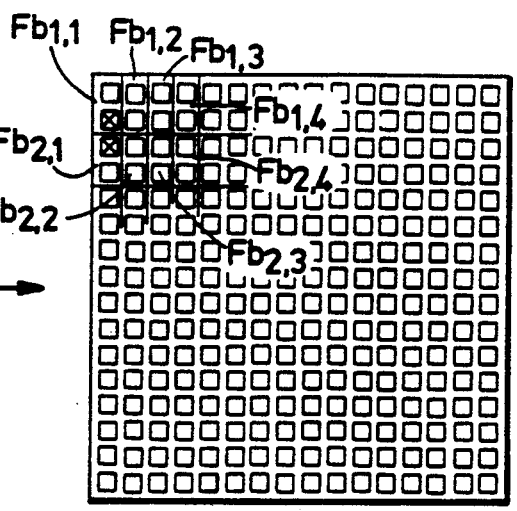

In FIG. 3a, the gray values are given for the 16 scan dots, upper left, in scan field 12. The process will be described in detail here only with respect to these 16 scan dots; the process is the same for the remaining scan dots 14 of scan field 12. The judgment of which recording dots 16 corresponding to scan field 12 will be printed starts from the individual scan dots or the gray values. First, the tonal values of two adjacent scan dots compiled into a smallest subfield $Fb_{i,j}$ are considered, as shown in FIG. 3b. For each of the smallest subfields, the average tonal value (average value of the tonal values) resulting from the tonal values of both scan dots of the smallest subfields is calculated. If this average value is above the gray value 128, one of both recording dots 16 of the pertinent smallest subfield is printed according to the pattern shown in FIG. 2b. The gray values of the individual scan dots are in the form of 8 place binary codes. The decision whether a recording dot is to be printed starts from the binary codes of the corresponding tonal values. Thus, the following calculation results from the smallest subfield $Fb_{1,1}$ of FIG. 3b:

```
 0 LLL L0L0   (122)
 L0 0 L L00 0  (152)
L 0 0 0 L 0 0L0
```

In the digital conversion method, the average value of two numbers is found suitabley by an addition and a shift step. For the above case, the resulting average value is

L000 L00L,0

At the same time, it is reasonable for the transfer bit of an 8 bit addition to assume the value "L", in case the sum of both numbers exceeds 255, its average value thus being greater than or equal to 128. Hence, the performance of an addition suffices to indicate, with the aid of the transfer bit, whether the average value of two numbers equals or exceeds the given limiting value. The use of this information is suggested first for the smallest subfield of FIGS. 1b or 3b, as the smallest subfields serve for the representation of the highest value bit of the average value of both tonal values.

For the other smallest subfields of FIG. 3b, there results analogously:

```
Fb2,1    L0 L0 00 0 0    (160)
         0 LL0 L0L0      (106)
         L 00 0 0 L0L0

Fb1,2    0 LL0 00L0      ( 98)
         0 LLL 000 L     (113)
         0 LL0 L 00LL

Fb2,2    0 L00 L0LL      ( 75)
         0 L00 0 LL0     ( 70)
         0 L0 0L 00 0 L

Fb1,3    0 L0L 00 LL     ( 83)
         L 00 0 00 L0    (130)
         0 LL0L 0L0 L

Fb2,3    00 L0 0 0LL     ( 35)
         00 L0 L00 0     ( 40)
         0 0L0 0 L0LL

Fb1,4    0 LLL 0 000     (112)
         0 LL0 L00L      (105)
         0 LL0 L L00L

Fb2,4    0 LL0 00L0      ( 98)
         0 0LL 000 0     ( 48)
         0 L00 L 00L0
```

Thus, recording dots are printed only in subfields Fb$_{1,1}$ and Fb$_{2,1}$, as in both cases of summing up noth tonal values, there results a transfer bit that has the value "L". According to the recording dot diagram shown in FIG. 2b, the recording dots with the x and y coordinates 1,1 and 3,1 are printed or addressed.

Figure 1B:
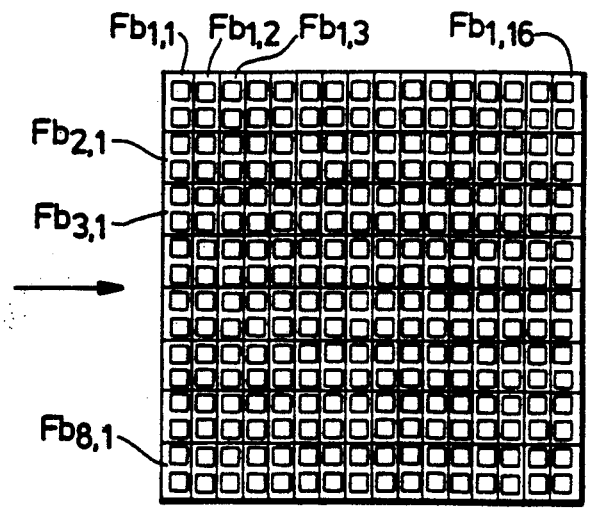

To determine which recording dots in the 128 smallest subfields of FIG. 1b or FIG. 3b are to be printed, only 128 adding steps are required. An individual 8 bit adder in low power Schottky technology requires, for one adding cycle, for example, 25 nanoseconds (ns), (SN 74 S 283 from Texas Instruments), which corresponds to an execution frequency of 40 mHz. To calculate the print dots for the 1/128 of the subfields as rapidly, multiple individual 8 bit adders can be connected in parallel and produce for example 16 adding cycles with 8 parallel-connected adders, thus, 400 ns or 2.5 mHz for the above instance. Significantly faster processing possibilities are achieved with the so-called customer-specific, integrated circuits, the adders of which to some extent exceed execution frequencies of 100 mHz. The data transfer rates of 1 Mbyte/s required for the online use of processes in modern scanners thus can be attained and clearly surpassed.

Figure 1C:
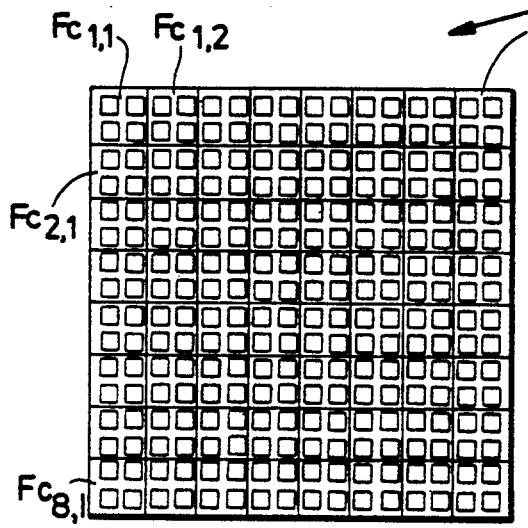
Figure 1D:
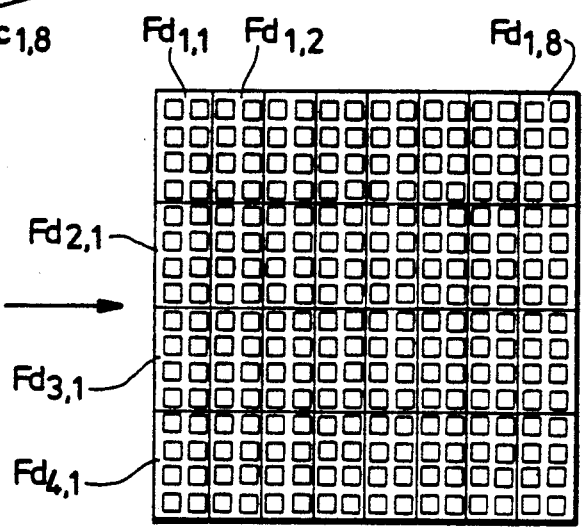
Figure 1E:
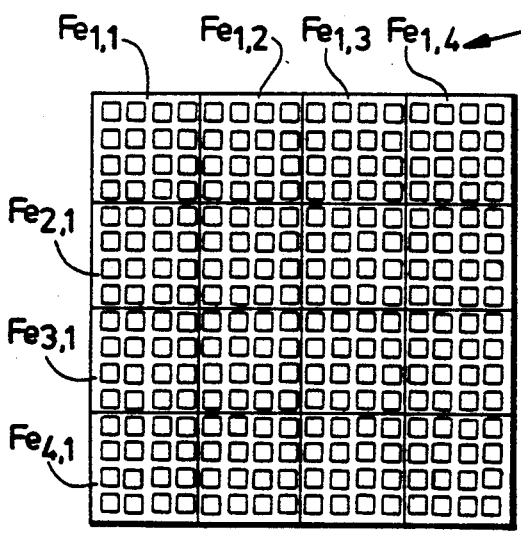
Figure 1F:
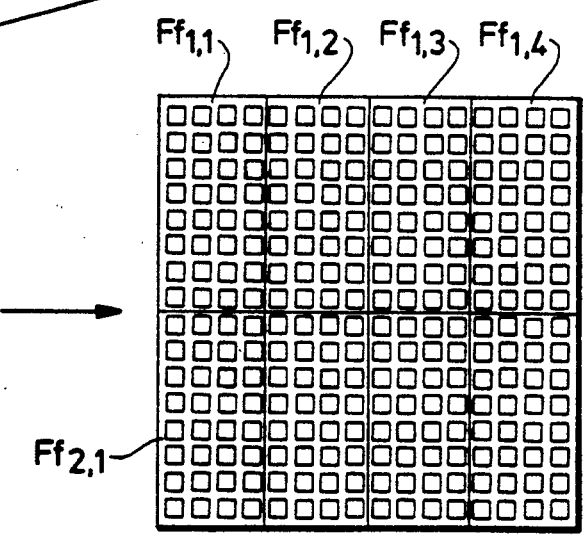
Figure 1G:
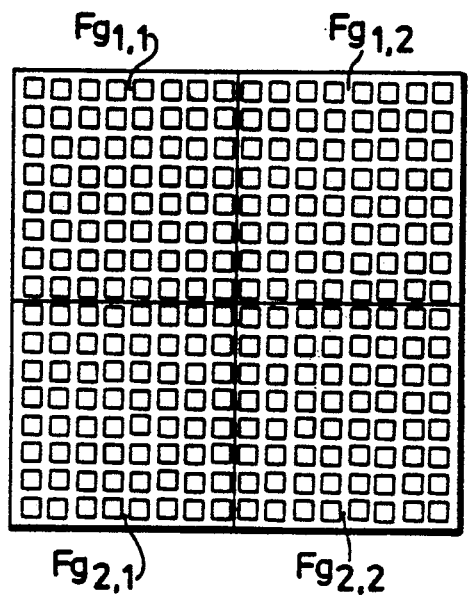
Figure 1H:
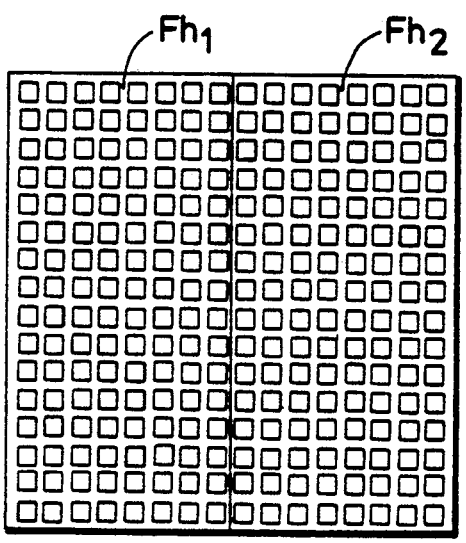
Figure 1I:
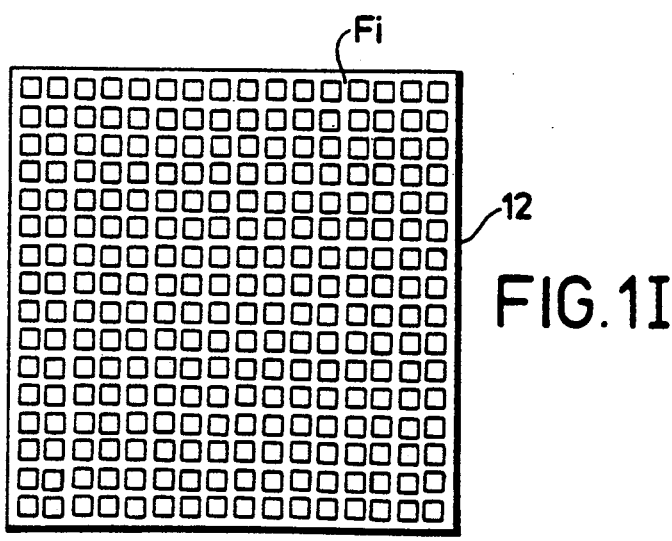
Figure 3C:
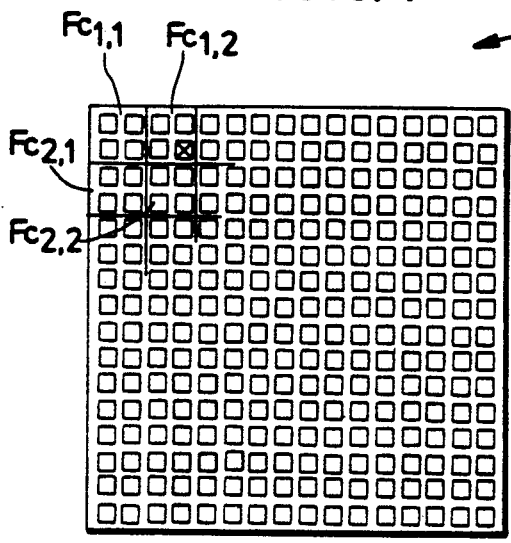

In the next step, the average tonal values are calculated for the subfields desginated in FIG. 1c or 3c, which constitute respectively 1/64 of the entire scan field. First, whether the average value of the four tonal values is greater than or equal to 128 is tested, that is whether the sum from the four tonal values is greater than or equal to 2×256=512. However, the sum of four binary coded numbers is already greater than or equal to 512, if the transfer bit, which results from the addition of seven lower value bits of our binary numbers, has the value "2L". The second order subfields Fc$_{1,j}$ serve to represent the second highest value bit of the average value of four tonal values Thus, it is not necessary to consider all eight places of the four binary coded tonal value data groups, but rather to add only up to and including the $2^6$ value position.

The sum of the four tonal values can be obtained from the individual tonal values, namely, by means of three addition steps. However, it is better to calculate the sum from the (already calculated) tonal value sums of those smallest subfields Fb$_{1,j}$, indicated in FIG. 3b, which are located respectively in one of the higher order subfields Fc$_{1,j}$ indicated in FIG. 3c. Only one adding step is required for this. The sum of these two tonal value sums is then exactly greater than or equal to 512 (the average value thus being greater than or equal to 256), if a transfer bit with the value "L" results from the addition of eight lower value bits of both tonal value sums. The second order subfields Fc$_{i,j}$ also serve to represent the highest value bit of the average value of both average tonal values derived respectively from two tonal values. Here, it is surprising that it is not necessary to determine whether the tonal value sum of the four tonal values is greater than or equal to 512 to allow for the highest value transfer bits resulting from the calculation of the tonal value sums of the smallest subfields. Evidently, neither the higher nor the lower value bits of the tonal value sums calculated in the first step play a role in the determination whether the sum is greater than or equal to 512. Therefore, an 8 bit adder suffices for the summing process.

The following calculations result for the second order fields indicated in FIG. 3c:

```
Fc1,1 = Fb1,1 + Fb1,2    0 0 0 L 00 L0
                         LL0 L 00 LL
                         0 LLL0 0L0 L

Fc2,1 = Fb2,1 + Fb2,2    0 000 L0L0
                         L00L 0 00 L
                         0 L00L L0LL

Fc1,2 = Fb1,3 + Fb1,4    LL0 L 0 L0 L
                         LL0 L L00 L
                         L L0L0 LLL0

Fc2,2 = Fb2,3 + Fb2,4    0 L00 L0 LL
                         L00L 0 0 L0
                         0 LL0L LL0 L
```

In the above example, only one transfer bit with the value "L" results from the calculation of the tonal value sums for the field Fc$_{1,2}$, which consists of the two smallest subfields Fb$_{1,3}$ and Fb$_{1,4}$. This means that only one recording dot in the second order subfield Fc$_{1,2}$ is to be printed. According to the recoding dot pattern shown in FIG. 2c, that dot is designated in FIG. 3c by the coordinates 2,4. Thus, to determine which recording dots within a second order subfield are to be printed, only 64 adding steps are required.

The above considerations can be applied similarly to higher order subfields. The next to be examined are the third order subfields Fd$_{1,1}$ and Fd$_{1,2}$ shown in FIG. 1d and 3d. If the average tonal value of the scan dots of each individual third order scan field is greater than or equal to 128, that is, the sum is greater than or equal to 4 4×256=1204, one of the recording dots of the pertinent third order subfield is to be printed. The tonal value sum is then exactly equal to or greater than 256 , if, on addition of the eight lower value bits of the tonal value sums of the pertinent second order subfield, a transfer bit results with the value "L". For both third order subfields Fd$_{1,1}$ and Fd$_{1,1}$, the example shows:

$$Fd_{1,1} = Fc_{1,1} + Fc_{2,1} \quad \begin{array}{l} LLL0\ 0L0L \\ \underline{L00L\ L0LL} \\ L\ L000\ 0000 \end{array}$$

$$Fd_{1,2} = Fc_{1,2} + Fc_{2,2} \quad \begin{array}{l} L0L0\ LLL0 \\ \underline{LL0L\ LL0L} \\ L\ L000\ L0LL \end{array}$$

Figure 2D:
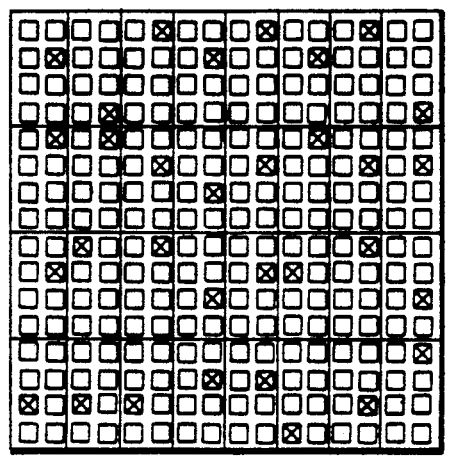
Figure 3D:
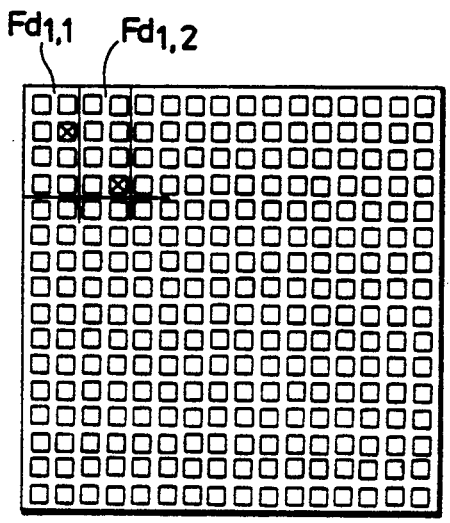

As the transfer bit from the summing process has the value "L" for both third order subfields, one recording dot of the eight recording dots of a subfield must be printed. The recording dots to be printed according to the recording dot pattern of FIG. 2d are shown in FIG. 3d. To determine whether one of the recording dots of the third order subfields is to be printed, only 32 adding steps are required in the third stage.

Figure 3E:
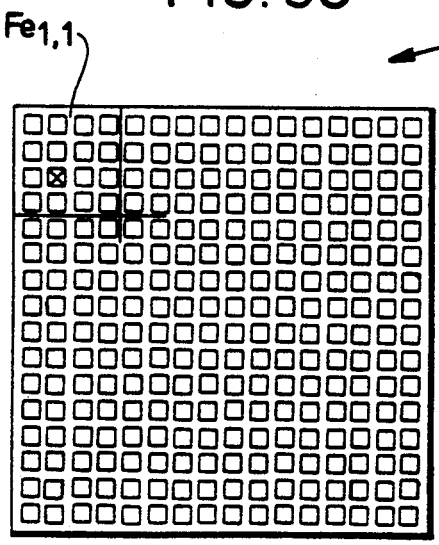

For the fourth order subfield $Fe_{1,1}$ shown in FIG. 3e, the analogous result is:

$$Fe_{1,1} = Fd_{1,1} + Fb_{1,2} \quad \begin{array}{l} L000\ 000\ 0 \\ \underline{L000\ L00\ L} \\ L\ 0\ 000\ L0LL \end{array}$$

Figure 2E:
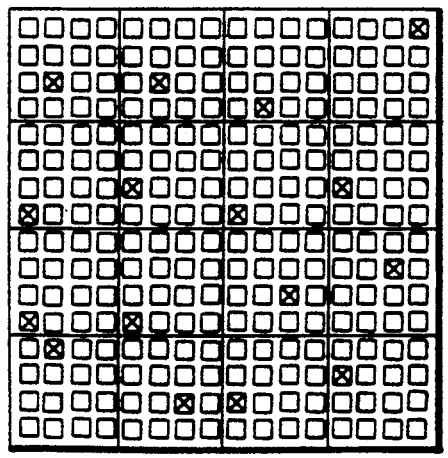
Figure 2F:
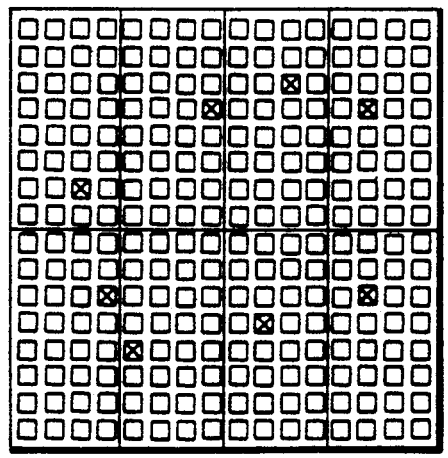
Figure 2G:
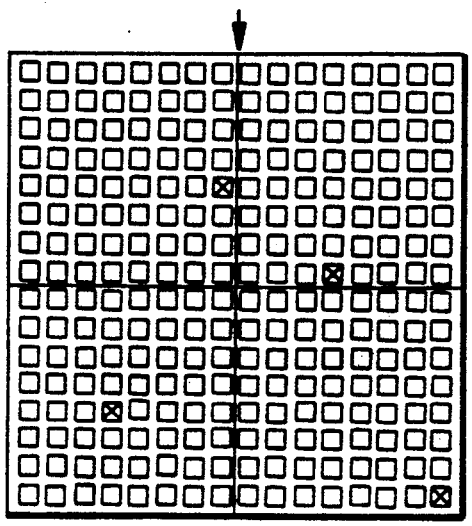
Figure 2H:
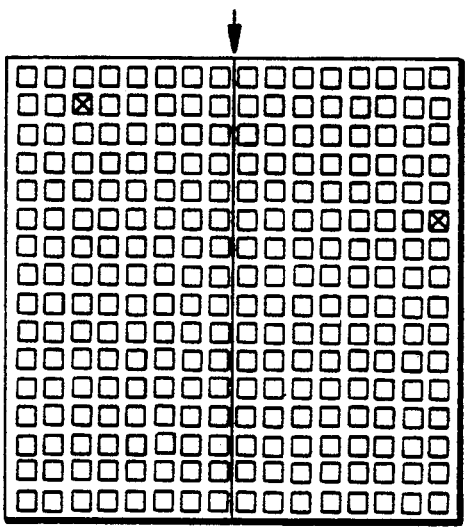
Figure 2I:
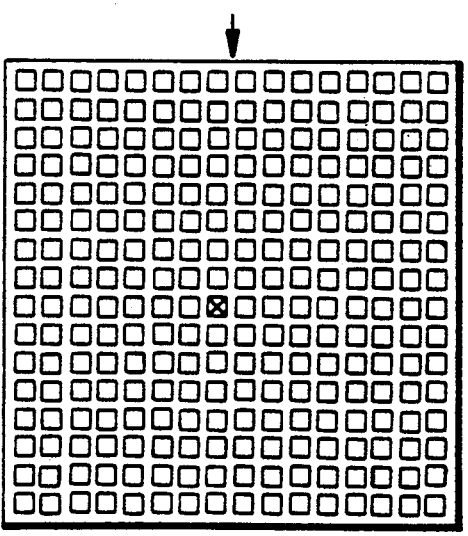
Figure 3F:
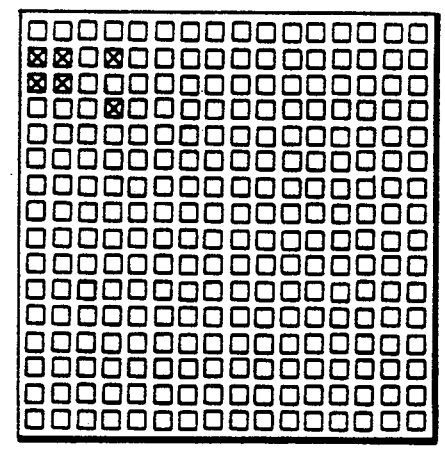

As the transfer bit has the value "L", one of the recording dots of subfield $Fe_{1,1}$ must be printed. The recording dot given by the recording dot pattern according to FIG. 2e is indicated in FIG. 3e. FIG. 3f shows all recording dots to be printed corresponding to the upper left corner of scan field 12.

If the process is applied to the entire scan field 12, the position of the recording dots to be printed corresponding to scan field 12 is obtained similarly by the above-described procedure.

Broadly speaking, the process produces binary signals, which are either "high" or "low", from the scan image dot tonal value signals. In this manner, an "analogue" image can be recorded binarily. The recording does not necessarily have to be in the form of a print of the image; the fact that the image is available in the form of individual binary signals, also permits the easy storage of the image on a magnetic storage device or a semiconductor storage device. Storage also involves recording the image in the sense of the present application.

Error calculations or error considerations are not required in the described process. The number of recording dots, which are to be printed per scan field to reproduce "scan-field-wise" exactly the tonal value of the original does not have to be calculated in advance, but rather results automatically from the distribution of the recording dots in the various order subfields. If each of the 128 smallest subfields is examined for whether one of its recording dots is to be printed, it is still not certain how many recording dots altogether must still be printed so that the scan field is reproduced true to the original with respect to its average tonal value as well as with respect to detail reproduction or detail contrast. However, at the end of the process of the invention, exactly as many recording dots are printed as required for the exact reproduction of the average tonal value of the scan field. As the scan field is subdivided into progressively smaller, interconnected subfields and the recording dots to be printed are distributed in each individual field of various orders, the individual details of the original are reproduced with maximum sharpness as well as maximum contrast Based on FIGS. 4a to 4f, a brief description will be given below of the procedure when the starting point to determine the position of the recording dots to be printed is not, as in the above case, a previously determined recording dot pattern; rather, the positions of the recording dots are determined based on a comparison of the tonal values of the scan dots belonging to the smallest subfields or alternatively based on a comparison of the tonal value sums of the scan dots of subfields comprising a next-higher order subfield. The tonal values of the 16 scan dots at upper left in scan field 12 of FIG. 4a as well as the subdivision of scan field 12 into individual subfields are in each case the same as in the case of the Example of FIG. 3a. The above considerations can therefore be taken into account when determining in which subfield a recording dot is to be printed respectively.

For the smallest subfield $Fb_{1,1}$, a recording dot is to be printed. In order to determine its position, tonal values 122 and 152 of the scan dots belonging to subfield $Fb_{1,1}$ (coordinates (1,1), (1,2)) are compared. The recording dot whose position corresponds to the scan dot with the greatest tonal value is printed. In this case, it is printed as the recording dot (1,2). The position of the second recording dot (1,1) assigned to subfield $Fb_{1,1}$ is stored. This recording dot may be printed in the next step of the process, which is described below. Correspondingly with respect to subfield $Fb_{2,1}$, for which likewise a recording dot is to be printed, recording dot (3,1) is printed and the position of recording dot (4,1) is stored. No recording dots are to be printed in the other smallest subfields under consideration in this Example. As far as these subfields are concerned, in each case only the position of the recording dots that may later need to be printed, is stored. Thus, e.g., for subfield $Fb_{1,2}$, the position of recording dot (2,2) is stored, since the corresponding scan dot (2,2) has a greater tonal value (namely 113) than the scan dot (1,2) likewise located in subfield $Fb_{1,2}$ (gray value 98). If therefore in the course of the second step another recording dot is to be printed for the area of the smallest subfield $Fb_{1,2}$, scan dot (1,2) must in any case not' appear as a printed recording dot, since it is lighter than scan dot (2,2). Thus, the position of the recording dot corresponding to scan dot (2,2) is stored. For the smallest subfields, therefore, the following recording dot positions are stored:

$Fb_{1,1}$: (1,1); $Fb_{2,1}$: (4,1)
$Fb_{1,2}$: (2,2); $Fb_{2,2}$: (3,2)
$Fb_{1,3}$: (2,3); $Fb_{2,3}$: (4,3)
$Fb_{1,4}$: (1,4); $Fb_{2,4}$: (3,4).

When the next-greater subfields Fc are considered, it turns out that a recording dot is to be printed only for subfield $Fc_{1,2}$. This subfield $Fc_{1,2}$ comprises the two smallest subfields $Fb_{1,3}$ and $Fb_{1,4}$. For both subfields the position of a recording dot that could be printed is stored. In order to decide which recording dot is printed, the tonal value sums of the two smallest subfields $Fb_{1,3}$ and $Fb_{1,4}$ are compared, and the recording dot is printed that corresponds to the smallest subfield with the larger tonal value sum. As far as subfield $Fc_{1,2}$ is concerned, it is therefore printed in precisely the area in which the original is darkest. In the present case the tonal value sum of subfield $Fb_{1,3}$ amounts to 213 and that of subfield $Fb_{1,4}$ amounts to 217. As a result, the recording dot (1,4) located in subfield $Fb_{1,4}$ whose position has previously been stored, is printed. The position of scan dot (2,3), which is likewise assigned to subfield $Fc_{1,2}$, is stored. For the remaining three subfields Fc, the positions of the recording dots possibly to be printed later are stored likewise, whereby for each of these three subfields two positions are possible, but only one is stored. For example, for subfield $Fc_{2,2}$ the position of recording dot (4,3) (for subfield $Fb_{2,3}$) and the position of recording dot (3,4) (for subfield $Fb_{2,4}$) are possible. In this case the position of the recording dot assigned to the smallest subfield with the larger tonal value sum is stored. This is the smallest subfield $Fb_{2,4}$, so that the position of recording dot (3,4) is stored. Subfields $Fc_{1,1}$ and $Fc_{2,1}$ are considered similarly, resulting in the following positions being stored:

$Fc_{1,1}$: (1,1); $Fc_{1,2}$: (2,3)
$Fc_{2,1}$: (4,1); $Fc_{2,2}$: (3,4).

When considering the subfields of next-greater order $Fd_{1,1}$ and $Fd_{1,2}$, it is found that one scan dot is to be printed per subfield. Two scan dots are possible per subfield, whereby the scan dot assigned to the subfield of next-smaller order with the greater tonal value sum is printed. The tonal value sum of the subfields of next-lower order $Fc_{1,1}$ and $Fc_{2,1}$ forming subfield $Fd_{1,1}$ amount to 485 (for $Fc_{1,1}$) and 411 ($Fc_{2,1}$); the recording dot belonging to subfield $Fc_{1,1}$, i.e., recording dot (1,1), is therefore printed. In the case of subfield $Fd_{1,2}$, recording dot (2,3) is printed. The positions of the recording dots likewise possible for each of the two subfields are stored, resulting in:

$Fd_{1,1}$: (4,1); $Fd_{1,2}$: (3,4).

For the next-larger subfield $Fe_{1,1}$, one recording dot must likewise be printed. In order to decide which of the two possible recording dots is printed, the sum of the tonal values of the scan dots assigned respectively to subfield $Fd_{1,1}$ and subfield $Fd_{1,2}$ is compared, resulting in a value of 896 for $Fd_{1,1}$ and 651 for $Fd_{1,2}$. The recording dot assigned to subfield $Fd_{1,1}$, i.e., recording dot (4,1), is therefore printed. For the subfield, recording dot (3,4) is stored as the recording dot possibly to be printed in the next step.

In FIG. 4f, the recording dots to be printed in the area under consideration are shown. In comparison to the Example according to FIGS. 3a to 3f, it is noteworthy that the printed recording dots are situated at points at which the original exhibits its darkest scan dots. Thus, for example, in the area of the original corresponding to subfield $Fc_{2,2}$, which in comparison to the rest is lightest, no recording dot is printed, which however, is the case in the Example according to FIGS. 3a to 3f. The original is therefore reproduced even more exactly in detail, or to put it another way: the sum of the errors made in the reproduction per scan dot is minimal.

The reliability of the process is clear in the light of both examples described in the following. It has been shown that the reproduction of image areas, which have a tonal value of 127 or 128, is especially prone to flaws. Therefore, the tonal values 127 and 128 are critical, because they correspond to both tonal values that can be represented by 256 recording dots. A scan dot with the tonal value 127 or 128 can, however, be reproduced only by a white or a black recording dot. Thus, the flaw originating in the recording of one individual recording dot is at a maximum.

In the first case, let's assume that the entire scan field 12 shows a tonal value of 128, that is, each scan dot 14 of scan field 12 shows a tonal value of 128. The recorded semihalftone image must thus show 128 black toned dots in the area corresponding to the scan field. For all smallest subfields $Fb_{i,1j}$ (see FIG. 1b), a tonal value sum results of:

$$\frac{\begin{array}{l}L000\ 0000\\ L000\ 0000\end{array}}{L\ 0\,000\ 0000}$$

The transfer bit of the tonal value sum is "L", that is, for each smallest subfield $Fb_{i,j}$, one recording dot is to be printed. Thus, in the first stage of the process, the recording dots shown in FIG. 2b are printed.

According to the above procedure, for the tonal value sums of the second order fields $Fc_{i,j}$ (FIG. 1c), the sum of the tonal value sums of both smallest subfields comprising a second order field is determined, such that the transfer bit of the tonal value sums of the smallest subfields is disregarded. From this, there results for the tonal value sums of the second order fields $Fc_{i,j}$:

$$\frac{\begin{array}{l}0000\ 0000\\ \end{array}}{0\ 0000\ 0000}$$

As the transfer bit assumes the value "0", a recording dot is not printed for the second order fields.

Exactly the same considerations can be employed for the third (FIG. 1d), fourth (FIG. 1e), fifth (FIG. 1f), sixth (FIG. 1g), seventh (FIG. 1h) and eighth (FIG. 1i) order fields. In all cases, the transfer bit of the tonal value sum has the value "0", which means that none of the recording dots of the individual, higher order subfields is printed. Thus, altogether, 128 recording dots are printed, namely, exactly one recording dot in each of the 128 smallest subfields corresponding to the tonal value sum for each smallest subfield. The critical tonal value of 128 for the entire scan field 12 can thus be reproduced exactly in the recorded image.

Now, let's assume that each scan dot 14 of scan field 12 has the tonal value 127. This yields for the tonal value sum of each smallest subfield $Fd_{i,j}$:

$$\frac{\begin{array}{l}0\,LLL\ LLLL\\ 0\,LLL\ LLLL\end{array}}{0\,LLLL\ LLL0}$$

Therefore, the transfer bit of the tonal value sum of each smallest subfield is "0". Thus, a recording dot is not printed for any of the smallest subfields.

There results for the tonal value sum of the second order subfields $Fc_{i,j}$ (FIG. 1c):

$$\frac{\begin{array}{l}LLLL\ LLL0\\ LLLL\ LLL0\end{array}}{L\,LLLL\ LL0\,0}$$

Figure 2C:
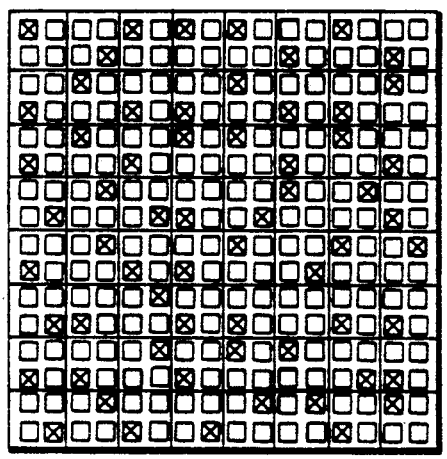

Thus, the transfer bit of the tonal value sum of each second order subfield has the value "L", so that, in each second order subfield according to the pattern shown in FIG. 2c, one recording dot is printed. Consequently, 64 recording dots are thus printed in the second stage of the process.

The results for the tonal value sums of the higher order subfields (FIGS. 1d to 1i) are:

$Fd_{i,j}$ $$\frac{\begin{array}{l}LLLL\ LL00\\ LLLL\ LL00\end{array}}{L\,LLLL\ L0\,00}$$
(32 additional recording g dots are printed)

$Fe_{i,j}$ $$\frac{\begin{array}{l}LLLL\ L000\\ LLLL\ L000\end{array}}{L\,LLLL\ 0\,000}$$
(16 additional recording dots are printed)

$Ff_{i,j}$  LLLL 0000
   LLLL 0000
   ‾‾‾‾‾‾‾‾‾
   L LLL0 0000
(8 additional recording dots are printed)

$Fg_{i,j}$  LLL0 0000
   LLL0 0000
   ‾‾‾‾‾‾‾‾‾
   L LL00 0000
(4 additional recording dots are printed)

$Fh_i$  LL00 0000
   LL00 0000
   ‾‾‾‾‾‾‾‾‾
   L L000 0000
(2 additional recording dots are printed)

$Fi$  L000 0000
   L000 0000
   ‾‾‾‾‾‾‾‾‾
   L 0000 0000
(1 additional recording dot is printed)

Thus, after the second step, 64, after the third step, 32, after the fourth step, 16, after the fifth step, 8, after the sixth step, 4, and after the seventh step, 2 additional recording dots are printed, such that after the eighth step, one more recording dot is printed. Altogether, 127 of the 256 recording dots corresponding to the scan field 12 are printed. In this case also, the tonal value 127 of the scan field is exactly reproduced.

Both examples described show how accurately the process works without any considerations being required for defects.

The described examples involved cases in which the recording detail was equal to the scan detail, that is, one scan dot was reproduced by one recording dot. Three examples are given in FIG. 5 in which the recording detail is $\sqrt{2}$ times greater than the scan detail, that is, one scan dot is reproduced by two recording dots (FIGS. 5a to 5d). FIGS. 5e and 5f represent an example in which the recording dot detail is twice as great as the scan detail, that is, one scan dot is reproduced by 4 recording dots.

Figure 5A:
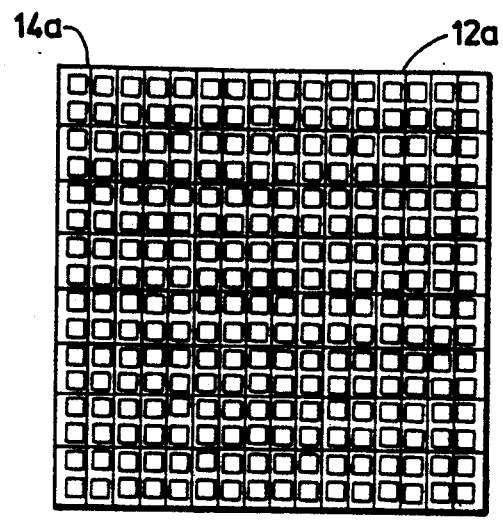
FIGS. 5a to 5f—examples for the recording of a two dimensional original with recording definition $\sqrt{2}$ times greater than scan definition.
Figure 5B:
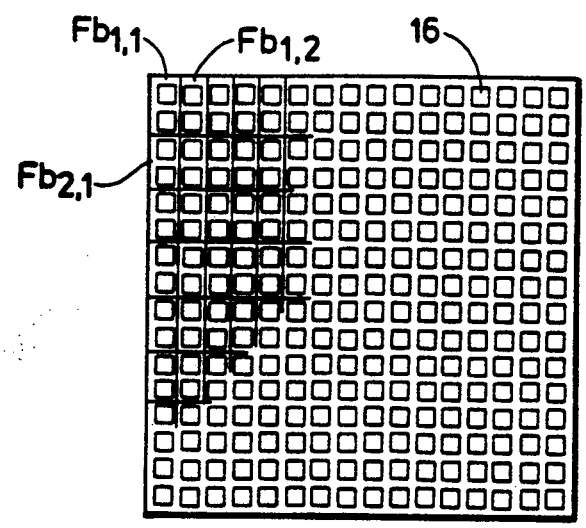

In the case shown in FIGS. 5a and 5b, each of the 128 scan dots 14a of the scan field 12a is reproduced by the two recording dots 16 of the smallest subfield $Fb_{i,j}$. The average tonal value for a smallest subfield is thus equal to the tonal value of this scan dot 14a that fills the smallest subfield. With such a location of the scan dot with respect to the smallest subfields, an adding procedure is not necessary for the smallest subfields; the transfer bit, on the basis of which a recording dot of a smallest subfield is printed, corresponds in this instance to the highest value bit of the binary coded tonal value of the pertinent scan dot. Thus, in the first process stage, 128 adding steps, that is, about 50% of the adding steps required for the whole scan field, are saved. The additional process stages can proceed analogously to the example described in FIG. 3. The smallest subfield tonal value sum, uncalculated but nevertheless required for the additional calculations, is generated from the binary coded tonal value of the corresponding scan dot by adding a "0" as the lower value bit. The highest value bit of these nine place binary codes corresponds to the transfer bit of the tonal value sum for the smallest subfield and is not considered for the subsequent calculations.

The recording of images with a recording-to-scan definition ratio of $\sqrt{2}$ has the advantage that less scan data accumulates, but the scan still has adequate sharpness. The higher recording definition relative to the scan gives the image less graininess, which makes it smoother and better to view. The processing of the tonal value data has the advantage of requiring 50% fewer adding steps per scan field, which corresponds to a saving of 128 adders in equipment requirement.

Figure 5C:
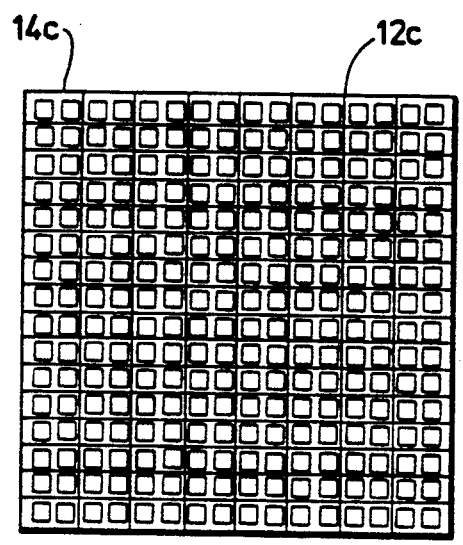
Figure 5D:
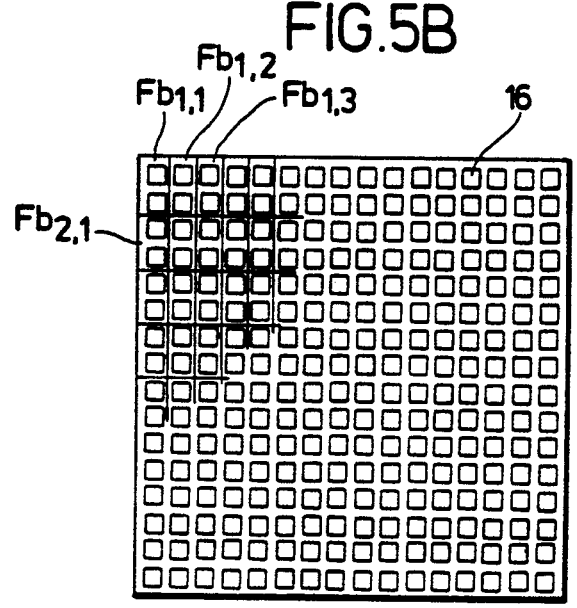
Figure 5E:
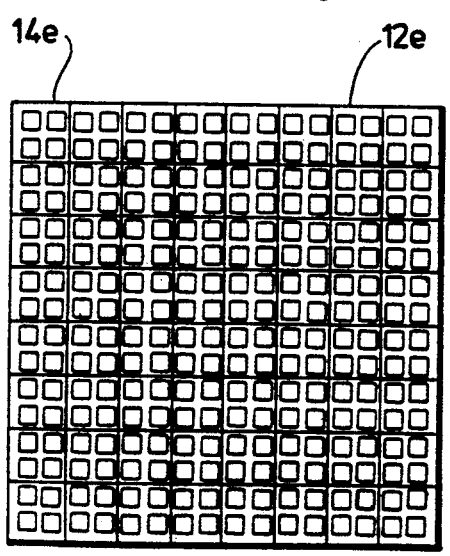
Figure 5F:
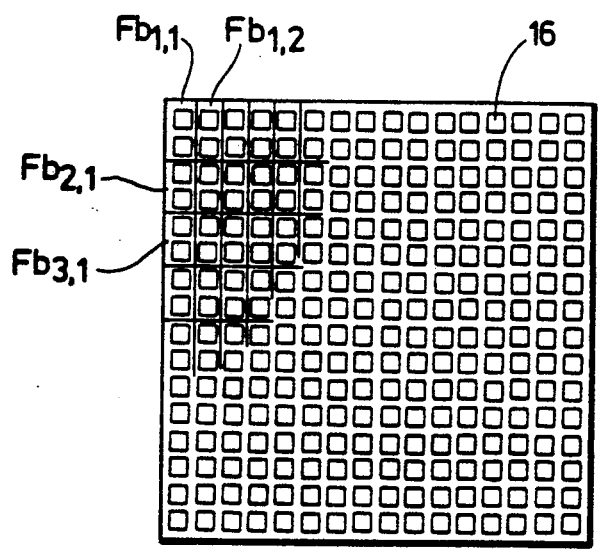

Similarly, FIGS. 5c and 5d show an example in which the recording detail is greater than the scan detail by the factor $\sqrt{2}$. Here, however, the scan dots 14c of the scan field 12c are rotated 90° with respect to the smallest subfields $Fb_{i,j}$. A scan dot 14c of scan field 12 is not reproduced by the two recording dots 16 of the one and same smallest subfield, but rather by two adjacent recording dots 16 of two adjacent smallest subfields. The process can proceed exactly as described for FIG. 3, if the left half of a scan dot 14c is considered as belonging to one smallest subfield and the right half is considered as belonging to the adjacent right smallest subfield.

In the case shown in FIGS. 5e and f, the recording definition is twice as great as the scan definition. Thus, a scan dot 14e of scan field 12e is represented by the four recording dots 16 belonging to the two smallest subfields. In this configuration, the adding procedures for the smallest subfields $Fb_{i,j}$ (see FIG. 5f or 1b) and for the second order subfields $Fc_{i,j}$ (see FIG. 1c) are replaced by considering the two highest value bits of the tonal value of scan dot 14e. The highest value bit corresponds to the transfer bit in the otherwise required tonal value sums procedure for the smallest subfields, while the second highest bit corresponds to the transfer bit of the tonal value sums procedure for the second order subfields. The additional steps of the process proceed in the manner described in connection with FIG. 3.

FIG. 6 shows the block wiring diagram of the apparatus of the above-described process. A sensor device (not shown), such as, for example, a scanner, scans the original and emits for each scan dot an analogue image signal, which is digitalized in an analogue/digital converter (also not shown) and is transmitted over a data flow path 22 into a data input storage device 24. The scanner emits control signals over an image control path 26 to a central control unit (microprocessor) 28. These control signals involve, for example, image start, image end and line end signals. The microprocessor 28 controls the data input storage device 24 by a control circuit 30, so that data received over the data flow path 22 is stored in individual data blocks. All tonal value data for a scan field, for example, a 256 eight place binary code, are stored in a data block in the storage device 24. The control signals emitted by the microprocessor as a function of the signals from the image control path 26 are produced for a control program stored in a ROM or storage device 30.

When all tonal value data pertaining to a scan field are stored as a block in the data input storage device 24, the data storage device 24, on a signal from the microprocessor 28 relays all 256 tonal value signals to an input switching network 34 over the output circuits 32 of the data input storage device 24 connected with the input switching network 34. The tonal value data signals queuing up on the circuits 32 as input signals of the input switching network 34 are distributed on the output circuits 36 of the input switching network 34 in such a way that the tonal value data of the smallest subfields queue, up on adjoining output circuits 36 of the input switching network 34. The input switching network 34 thus connects its inputs with its outputs in such a manner that the tonal value data of a smallest subfield queue up on adjoining outputs, the tonal value data signals of a second order subfield queue up on an adjoining pair of outputs and so on. The input switching network 34 consists essentially of a network of controlled switches, with which the inputs and outputs of the input switching network 34, after control processing, can be interconnected in any desired manner. Microprocessor 28 controls the individual switches and is connected with the input switching network 34 over the control circuits 38. Multiple control patterns for the input switching network 34 are stored in the ROM 30, so that control of the switches and, thereby, compilation of the tonal value data into the individual data blocks of various sizes can be modified from scan field to scan field. The distribution of the tonal value data into the individual blocks of various sizes corresponds to the subdivision of the scan field into subfields of various sizes.

The tonal value data "to be sorted out" in the input switching network 34 is transferred parallelwise to an arithmetic processor 40, which are connected with the output circuits 36 of the input switching network 34. The arithmetic processor 40, which consists of a cascade type of network of individual, interconnected digital adders, is described more accurately later with the aid of FIG. 7. The arithmetic processor 40 performs the adding steps and emits a binary output signal per data block, which shows whether a recording dot in a subfield corresponding to a data block is or is not to be printed. The signals emitted for each data block are transmitted over output circuits 42 as input signals into an output switching network 44 connected with the output circuits 42.

The output switching network 44, like the input switching network 34, consists of a network of controlled, interconnected switches, which connect the input of the output switching network 44 with switch control outputs 46. The control signals for the output switching network 44, that is, for the controlled switches of the output switching network 44, are produced by the microprocessor 28 from the control patterns stored in ROM 30 and are transmitted to the output switching network 44 over the control circuits 38, over which the input switching network 34 is also controlled. The number of outputs of the output switching network 44 is equal to the number of recording dots per scan field. If, for example, the distribution, shown in FIG. 2, of the recording dots to be printed as a function of the respective average values is taken as the basis, then the switch matrix of output switching network 44 is controlled in such a manner that each input circuit for a smallest data block (for a smallest subfield $Fb_{i,j}$ FIG. 1b) is connected with the output of the output switching network 44 for the recording dot to be printed within the smallest subfield. The inputs for the higher order data blocks are connected similarly with the corresponding outputs.

The binary output signals of the output switching network 44 are transmitted over output circuits 46 to a data output storage device 48. The data output storage device 48 is controlled by the microprocessor 28; the required control signals are emitted by the microprocessor 28 over control circuits 50 to the data output storage device 48. The binary signals arriving per scan field over output circuits 46 for the subdivision of the original into the scan fields are stored in the data output storage device 48 controlled by the microprocessor 28. If all binary data are present for an original, these are transmitted, at a signal from microprocessor 28, over output circuit 52 of the data output storage device 48 to the recording apparatus (not shown).

Let's assume for the following considerations that a scan field consists of 16 scan dots and is reproduced by 16 recording dots. The (analogue) tonal value of a scan dot is then converted in the analogue/digital converter into a four place digital signal. Thus, 16 tonal values (from 0 to 15) can be put into binary code form. The data input storage device 24 contains per scan field 16 four place digital signals, which it transmits over its output circuits 32 to the input switching network 34. For parallel data processing, the input switching network 34 has 16×4 inputs and 16×4 outputs. The scan field consisting of 16 scan dots is, as shown in FIG. 8, split into 15 subfields, that is, the arithmetic processor has 15 outputs, namely one for each subfield (each data block). Thus, the arithmetic processor 40 produces 15 binary output signals from the 16×4 binary input signals. In the output switching network 44, 16 binary output signals are produced from these 15 binary output signals of the arithmetic processor, namely, one output signal for each of the 16 recording dots corresponding to the scan field. Accordingly, the data output storage device 48 requires per scan field 16 individual storage cells, whereas the data input storage device 24 requires four times as many per scan field. The quantity of data has thus been decreased by a factor of four. Generally speaking, the quantity of data is reduced by the square root of the scan or recording dots compiled to a scan field.

Figure 7:
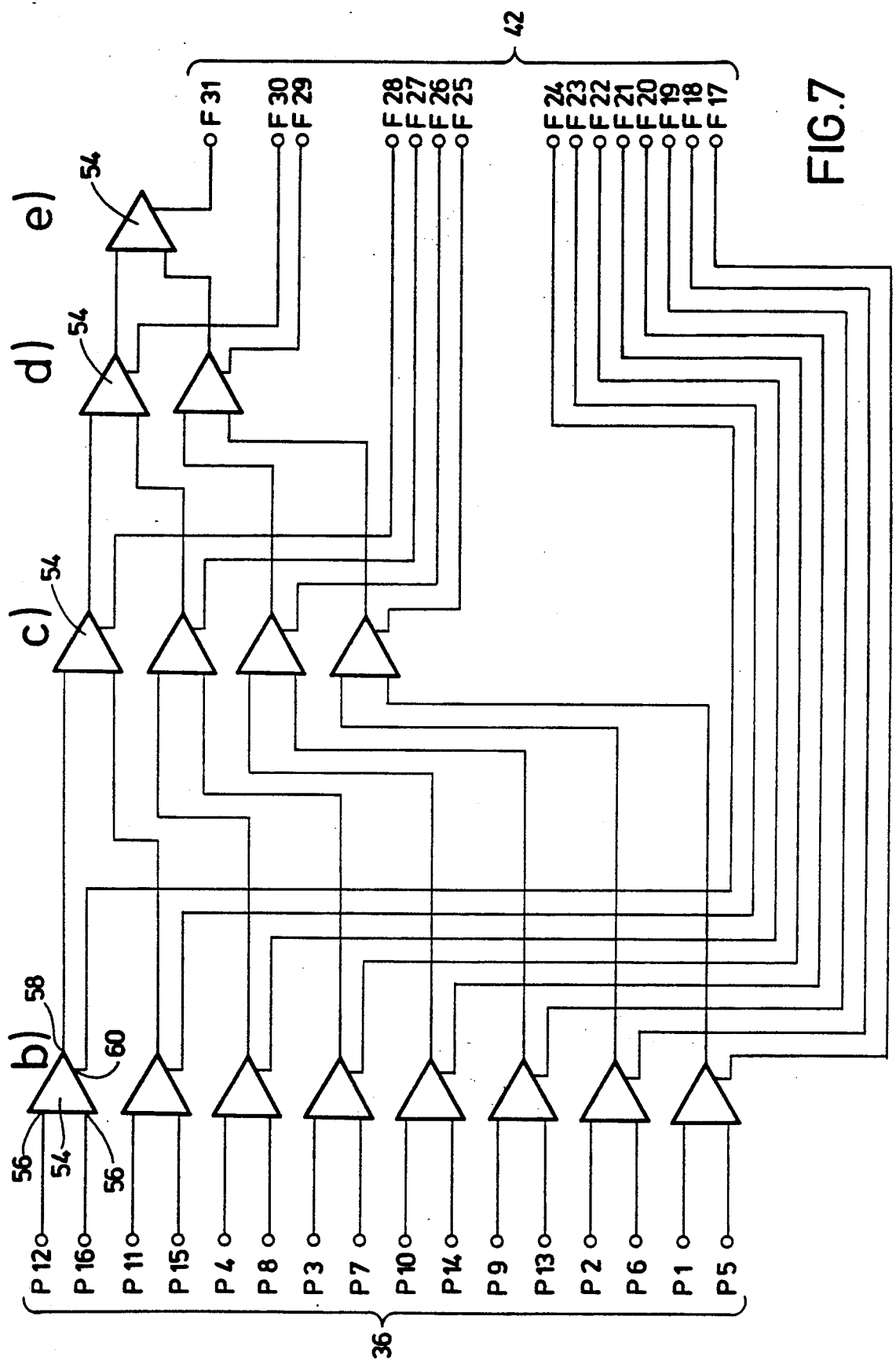
FIG. 7—the construction of the arithmetic processor in FIG. 6.

With the aid of FIG. 7, the construction of the arithmetic processor 40 is described for the case wherein a scan field has 16 recording dots. Fifteen recording dots suffice to represent 16 tonal values. The recording dot shown in FIG. 8f with the reference number 19 is not needed. This does not affect adversely the reproduction for the reasons explained in connection with FIG. 2. The representations in FIGS. 8 and 9 are greatly enlarged; actually, the recording dots have a diameter of 20 μm.

The scan field, shown in FIG. 8, consisting of the scan dots P1 to P16, is subdivided, as shown in FIGS. 8b to 8f, into 15 subfields, which are identified by the reference numbers shown in the figures.

The arithmetic processor 40 consists of a network of cascade, interconnected adders 54. The first "cascade stage" b has as many adders 54 as there are smallest subfields or data blocks. In the present example, eight smallest data blocks F17 to F24 are present. The tonal value sum from the tonal values of both tonal values of a smallest data block is added in the adders of the first stage b. The second stage c of the cascade has as many adders 54 as there are second order subfields (data blocks). According to FIG. 8c, this is four. The inputs of the adders 54 of the second stage c are connected with the outputs of those adders 54 of the first stage b, which calculate the tonal value sums of both smallest data blocks compiled into the second order data block. In the third stage d of the cascade, there are only two adders 54, which, according to the compilation, shown in FIGS. 8c and 8d, of second data blocks (FIG. 8c) into third order data blocks (FIG. 8d), are connected with the outputs of the adders 54 of stage c. In the last cascade stage e, there is only one adder 54, the inputs of which are connected with the outputs of both adders 54 of stage d. The adders 54, shown in FIG. 7, are 4 bit digital adders with 2×4 inputs 56, four outputs 58 and one transfer output 60. The junction or connection circuits, shown as thick lines in FIG. 7, of the adders 54 comprise four parallel circuits respectively, while the circuits indicated by thin lines are individual connections.

The 16 four bit circuits connected with the adders 54 of the first cascade stage b represent the inputs 36 of the arithmetic processor 40. The transfer outputs 60 of the adders 54 correspond to the outputs 42 of the arithmetic processor 40, so that each transfer output 60 is assigned to a data block (subfield). FIG. 7 shows which output belongs to which data block indicated in FIG. 8. For example, so that the transfer output 60 of the topmost adders 54 of the first cascade stage b corresponds to the output for the block F24, the tonal value data for the scan dots P12 and P16 must be directed to the inputs 56 of the adders 54. FIG. 7 shows which tonal value data must queue up to which inputs 36 of the arithmetic processor 40. As a result of control by the microprocessor 28, the input switching network 34 operates so that the tonal value data signals are sorted and compiled by groups in a manner corresponding to the subdivision of the scan field into subfields.

Figures 9A, 9B:
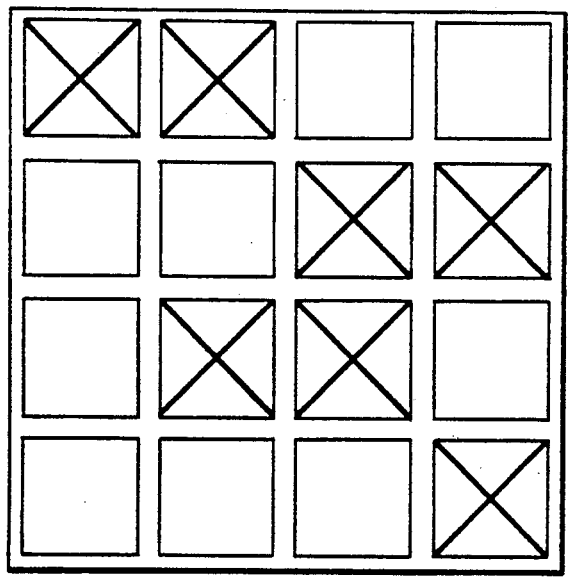
FIGS. 9a and 9b—an example to illustrate the method of operation of the device shown in FIG. 6 and of the arithmetic processor shown in FIG. 7.

The operation of the arithmetic processor 40 is explained with the aid of an example. In FIG. 9a, the pertinent tonal value is given for each of the 16 scan dots. FIG. 9b shows the distribution of the recording dots to be printed, if the scan field is reproduced with the tonal values given in FIG. 9a. The following calculation is analogous to the calculation performed in connection with FIG. 3.

$$
\begin{array}{ll}
F17 = P1 + P5 \quad \begin{array}{r} 0LLL \\ LLLL \\ \hline L\,0\,LL\,0 \end{array} & F18 = P2 + P6 \quad \begin{array}{r} 0L0L \\ 0L00 \\ \hline 0L0\,0L \end{array} \\[1em]
F19 = P9 + P13 \quad \begin{array}{r} 0\,00\,L \\ L00\,L \\ \hline 0\,L0L0 \end{array} & F20 = P10 + P14 \quad \begin{array}{r} 00\,LL \\ 00\,L0 \\ \hline 0\,0L0\,L \end{array} \\[1em]
F21 = P3 + P7 \quad \begin{array}{r} L000 \\ L0\,LL \\ \hline L\,00\,LL \end{array} & F22 = P4 + P8 \quad \begin{array}{r} L00\,L \\ LL0\,L \\ \hline L\,0\,LL\,0 \end{array} \\[1em]
F23 = P11 + P15 \quad \begin{array}{r} LL0\,L \\ 0\,LL\,0 \\ \hline L\,00\,LL \end{array} & F24 = P12 + P16 \quad \begin{array}{r} 0\,LL0 \\ L0\,L\,0 \\ \hline L\,0\,0\,0\,0 \end{array} \\[1em]
F25 = F17 + F18 \quad \begin{array}{r} 0\,LL0 \\ L00\,L \\ \hline 0\,LLLL \end{array} & F26 = F19 + F20 \quad \begin{array}{r} L0\,L\,0 \\ 0L0\,L \\ \hline 0\,LLLL \end{array} \\[1em]
F27 = F21 + F22 \quad \begin{array}{r} 0\,0\,LL \\ 0\,LL0 \\ \hline 0\,L00\,L \end{array} & F28 = F23 + F24 \quad \begin{array}{r} 00\,LL \\ 000\,0 \\ \hline 0\,00\,LL \end{array} \\[1em]
F29 = F25 + F26 \quad \begin{array}{r} LLLL \\ LLLL \\ \hline L\,LLL0 \end{array} & F30 = F27 + F28 \quad \begin{array}{r} L0\,0\,L \\ 0\,0\,LL \\ \hline 0\,LL\,0\,0 \end{array} \\[1em]
F31 = F29 + F30 \quad \begin{array}{r} LLL0 \\ LL0\,0 \\ \hline L\,L0\,L0 \end{array}
\end{array}
$$

Including consideration of the distribution, shown in FIG. 8, of the dots to be printed per subfield, the evaluation of the transfer bits originating from the summing process results in the distribution, shown in FIG. 9b, of the recording dots to be printed within the scan field.

Figure 10:
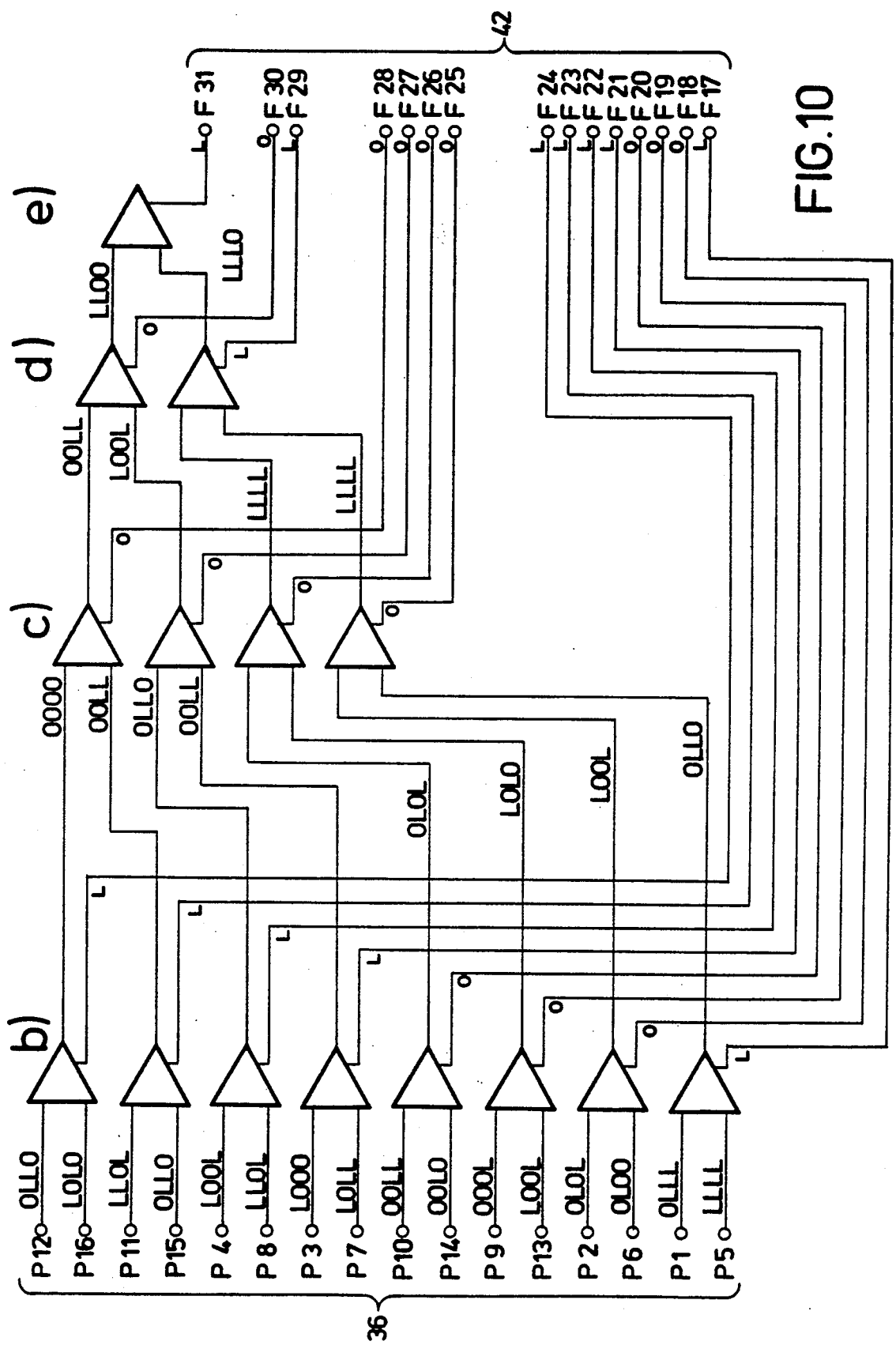
FIG. 10—the digital signals flowing, in the case of the example according to FIGS. 8 and 9, to the adders as well as the inputs and outputs of the arithmetic processor.

FIG. 10 shows which digital signals, for the example given in FIG. 9a, queue up on the individual circuits of the arithmetic processor 40. As can be seen, a binary signal queues up on the individual output circuits 42 of the arithmetic processor 40, which signal corresponds to the transfer bit of the tonal value sum of the pertinent data block. Although only the last four bits of the tonal value sums, rather than the complete tonal value sums, are processed in the cascade stages c, d and e, these lead to the correct output data. The microprocessor 28 controls the output switching network 44 in such a manner that the input of the output switching network 44, on which the output signals queues up for a data block, is connected with the output of the output switching network 44 for that recording dot which is to be printed as a function of the magnitude of the tonal value sum of the data block.

FIGS. 6 and 7 show the connection relationships of the above described process. The example represented in both figures with four cascade stages is, furthermore, especially interesting, if the quality requirements are somewhat lower for the reproduction. The scanned image signals from scanners in the field of office communications, for example, from digital copiers or telefacsimile devices, show a signal/noise ratio significantly lower than is the case for devices in the graphics arts industry. By subdividing the original into scan fields with $16 \times 16 = 256$ scan dots respectively, the eight stage cascade circuitry of the arithmetic processor 40 required for processing would evaluate practically only noise in the last cascade stages, which is uneconomical. Instead, it is reasonable to optimize the number of cascade stages for the number of "noise-free image signal bits". For a range of requirements, four cascade stages are acceptable economically as well as qualitatively.

The special efficiency results from the four bit adders being adequate to conduct the calculations according to the above-described process and relatively few additions, namely $1+2+4+8=15$, being sufficient to process completely the four stage cascade. Furthermore, the matrix of the scan signals, which, in any event, comprise only four bits in each case, as well as the recording dot matrix, consist of only 16 elements, so that only very small storage devices are needed or larger buffer storage devices are easy to build and to manage.

Due to the high efficiency and the low technical expense, it is especially advantageous to interconnect all 15 adders without intermediate storage, as is shown in FIG. 7. Because of the direct interconnection or integration to unit, it is feasible to assure the calculations for a matrix reliably and in clearly less than 100 ns.

The complex adder block of FIG. 7 can advantageously omit the four upper cascade stages of an eight stage cascade by separating the noise portion, represented by the four lower order bits, at the fourth cascade stage and processing further only the four higher order bits actually evaluated.

Each scan field can use the same division into subfields and the same distribution of recording dots to be printed per subfield, if the quality requirements of the reproduction are not set too high. In such a case, the input and output switching network can be built with hard wired inputs and outputs. If one and the same subdivision of the scan field and distribution of the dots to be printed is used, patterns originate in the reproduction and are especially undesirable in color prints. Namely, the patterns of the individual process colors superimpose one another and form interference patterns, the so-called moire, the structures of which are clearly larger than the structures of the individual colors. Therefore, it is better to vary from scan field to scan field the subdivision of the scan field and the distribution of the recording dots to be printed (the orientation of the scan and recording dots), to avoid the occurence of undesirable structures. The choice of the type of orientation in each case can be determined according to a random or semirandom principle. In the apparatus shown in FIGS. 6 and 7, the various types of orientation are stored in the ROM 30 and accessed by the microprocessor 28. For the subdivision of the scan field (input orientation), an example of which is given in FIG. 1, as well as for the distribution of the recording dots to be printed per subfield (output orientation), numerous solutions can be found, which solutions take into account in various degrees the various practical requirements. In the apparatus of FIG. 6, the various orientations can be realized with the aid of both networks 34 and 44 controlled from the microprocessor 28.

The foregoing description of the process and the apparatus involves the case of the original being recorded in the same shade. However, if it is to be reproduced darker or lighter and/or more or less contrasty, it is advantageous to first recalculate the scan (analogue) tonal value signals in accordance with a corresponding correlation table or characteristic curve. Then the recording process can be conducted with the gray tone 128 as the reference value and correspondingly, the data conversion device of FIGS. 6 and 7 are used. All previous simplifications given and used also apply for this type of handling recorded images.

Therefore, the invention provides that for each smallest subfield as well as for each of the higher order subfields to which the pertinent smallest subfield belongs, the average value is determined from the tonal values of the scan elements located in the particular subfield and that, in each case, at least one of the recording elements located in the particular subfield is printed, if the average value is greater than a given reference tonal value.

In the process of the invention, the distribution of the print or no-print recording dots, which represent a scan field of the original in the reproduction, is measured. The number of recording dots printing per subfield or scan field is dependent upon whether the average tonal value of the scan dots located in a scan field or subfield is greater than, smaller than or equal to a given reference tonal value. If the original should be reproduced in an equivalent shade, the reference tonal value is half as large as the highest possible tonal value; for black and white originals, the reference tonal value would thus be a tonal value that lies half way between the tonal values for white and for black. If the original should be reproduced in a darker (lighter) shade, the reference value is smaller (larger) than the average value of the tonal value scale of the original. By raising the highest tonal value found in an original and/or lowering the smallest tonal value found in the original, an intensification of the contrast of the original can be achieved in the reproduction.

The process of the invention starts first with the smallest subfields into which a scan field of the original is divided. This means that, first, the tonal value data of the smallest data block are considered. The average tonal value, thus the average value, is determined from the pertinent tonal value data for each smallest block. If this average value is greater than the reference tonal value, at least one of the recording dots assigned to the smallest subfield under consideration is printed, or stated more accurately, is considered as a recording dot to be printed. Then, the next larger subfields, which, in each case, are made up of a specific number of the smallest subfields, are considered. The average tonal value is determined from the tonal value data of the data blocks corresponding to these, next larger subfields. If the average tonal value is greater than the reference tonal value, one of the recording dots assigned to the next larger field being considered is printed. In addition to the recording dot printed as a function of the average tonal value of the scan elements of the smallest subfield, an additional recording dot thus is printed in relation to the next larger subfield. In the next phase of the process, the next larger subfields are examined as described above, until, finally, in a last phase of the process, the scan field itself is examined. If the average value of all scan elements located in a scan field is greater than the reference tonal value, one of the aggregate of recording dots corresponding to the scan field is printed.

Thus, on one hand, sufficient recording dots per scan field are printed to reproduce exactly on the average the tonal value of each scan field of the original. On the other hand, the recording dots to be printed are distributed on the scan field in such a manner that the original is imaged with the least possible loss in sharpness or, expressed otherwise, with maximum accurate detail reproduction. For good reproduction of an original, it is also particularly critical, in addition to the tonal values of the original being reproduced well-nigh exactly, that the original is reproduced in detail, that is with maximum definition. The subdivision of the original into the scan fields permits only a relatively low definition of the original; nevertheless, the division of the original into the scan fields also has the function of fulfilling reliably the minimum requirements with respect to the average tonal values, that is, at least to reproduce well-nigh exactly the tonal values relative to the scan fields of the original. The desired definition capability, and thereby a reproduction of the original with the desired sharpness, is attained by printing, starting from the smallest subfields, at least one from the aggregate of recording dots assigned in each case to the subfield, for each subfield on the basis of the average tonal value of the subfield. Why the detail reproduction of an original with progressive subdivision of the scan fields into progressively smaller subfields increases the accuracy of the detail reproduction is explained in the following with the aid of an example.

Empirically, the human eye can distinguish visually up to about 150 tonal value steps (thus, in the case of a black and white image, about 150 gray steps from black to white). The tonal value of a scan field should thus be reproducible by one of the 150 tonal value steps, in which case the scan field (that is, the areas of the original within which the human eye can distinguish tonal values) should not be selected to be too large. As the original is reproduced only by individual recording dots with the color value of "print" or "no-print", a scan field must be reproduced by at least 150 recording dots. Depending on the number of recording dots printed for this field, 150 tonal value steps result.

The current conventional digital technique for image processing suggests that the size of the scan field should be 256 scan dots or should be reproducible by 256 recording dots. The scan or recording dots are, in each case, arranged in a (16×16) matrix. The average tonal value of such a scan field can be designated semiaccurately, namely, by one of 256 tonal value steps (that is, with an accuracy of 1/256). If, for example, the diameter of scan dot is taken to be about 10 $\mu$m, a scan field is obtained of the size 300 $\mu$m×300 $\mu$m (16×20 $\mu$m=320 $\mu$m≈300 $\mu$m). A centimeter of the original can thus be subdivided into about 30 scan fields arranged adjacent to or above each other. With the division of the original into scan fields, the definition capability of the original is thus only about 30 lines/cm (30 l/cm). This definition capability is obviously too low to fulfill the requirements from the standpoint of the sharpness and detail reproduction of the original. To be able to achieve a greater definition capability, the scan field is subdivided into multiple smaller fields. The definition capability for the subfields of the scan field increases in accordance with the size of the subfields into which the scan field is subdivided. For example, the subdivision of the scan field into four subfields makes possible a doubled definition capability of the scan field; a further subdivision of the individual subfields into four more equal size subfields, a fourfold definition capability, etc. In the limiting instance, the scan field can be subdivided 256 times, that is, can be reproduced 256 recording dots, so that the highest possible definition capability, in the case of the example, 500 l/cm, is attained. In this instance, the original will be reproduced in lines 20 $\mu$m wide. A 1 cm wide strip of the original would thus be reproduced by 500 lines with a width of 20 $\mu$m on the imaging medium.

In the process of the invention, error considerations or error calculations are not needed. Starting with the individual scan dots or the individual smallest subfields, the 256 scan signals per scan field with, in each case, 256 signal steps, which are required to assign to each scan signal (each scan dot) a tonal value between 0 and 255, are transformed into 256 binary recording signals, which are either "high" or "low". This means that, for storage of an original as a semihalftone image, only 256 bits are required per scan field instead of the 256 bytes (256×8 bits) required for the scan signals. The necessary storage requirements are thus reduced by a factor of 8. The determination whether the average tonal value from the scan signals pertaining to a subfield is greater than the reference tonal value, for example, greater than the average representable tonal value, can be performed very quickly with the aid of the scan signals that are available in digital form. With the aid of the maximum value bits of the tonal value sum from the binary scan signals for a subfield, it can be established whether the average tonal value for the subfield is greater than the average representable tonal value. If the maximum value bit is a "1", this means that the average value is greater than the greatest number represented by the places of the added binary numbers divided by 2, that is, greater than the average representable number. Thus, the average value determination does not have to be carried out completely; it suffices to consider only the maximum value bit of the sum and the average value is estimated with the aid of this bit. The term "average value determination" is thus understood to be also "average value estimate".

A significant advantage of the process of the , invention is its simplicity, which permits correspondingly simple and rapidly operating embodiments. For this reason, its use is opportune if an image original has to be processed "on line"and rapidly, for example, in a scanner with about 1 M byte/s maximum data transfer or with very high halftone type definition capability such as 500 l/cm. Furthermore, its use is also opportune for the transmission not only of line, graphic or text originals but also screen and halftone images over the digital, transmission lines available today, for example, digital copying or Telefax. Finally, its use is also advantageous for large surface digital display, for example, LCD displays, which have the same requirements. In addition, the process can also be used for low-distortion transfer of screen and line originals onto digital recording carriers, especially if a high definition scanning apparatus is used to record the original and the binary recording dots are sufficiently small.

In an advantageous further embodiment of the process according to the invention, it is provided that for a smallest subfield, the recording element selected to be reproduced is the recording element assigned to the scan element belonging to the smallest subfield and having the largest tonal value, and the recording element selected for a higher order subfield is the one assigned to the scan element of the next-lower order subfield belonging to the examined subfield and having the greatest tonal value sum, whereby the position of the recording element to be reproduced is determined randomly whenever the tonal values or tonal value sums are equally large. If the average value of the tonal values of the scan dots belonging to a smallest subfield are greater than the reference tonal value, the recording dot to be printed is determined to be the dot assigned to the scan dot with the greatest tonal value. This ensures that precisely that recording dot is printed whose position within the recorded image corresponds to the most heavily printed scan dot of the smallest subfield under consideration. Exactly the same procedure is followed in considering the higher order subfields, composed in each case of multiple subfields of next-lower order. If the average value of all scan dots belonging to the higher order subfield under consideration is greater than the reference tonal value, the recording dot to be printed is determined to be a recording dot assigned to the subfield of next-lower order whose scan dots have the largest tonal value sum when their tonal values are summed. If therefore a recording dot is printed for a higher order subfield, it is printed in the area in which the subfield is printed most heavily. If the tonal values of all scan dots assigned to a smallest subfield or a higher order subfield, respectively, are equal to one another and greater than the reference tonal value, the selection of the recording dot to be printed is controlled by a random generator.

If no recording dot is to be printed for a smallest subfield, because the average tonal value of the assigned scan dots is smaller than the reference tonal value, the position of the recording dot corresponding to the scan dot with the greatest tonal value is stored as the position of a recording dot possibly to be printed later. If a recording dot is, to be printed for a next-higher order subfield to which the above previously considered smallest subfield belongs, and indeed in the area corresponding to the smallest subfield, the exact recording dot is printed whose position has previously been stored. The process according to this further embodiment of the invention requires a certain outlay for data management and storage, since the positions of the recording dots to be printed are determined by comparison with the tonal value or tonal value sums of the individual recording dots or groups of recording dots, respectively, and the positions of the recording dots (possibly later) to be printed are stored. The image is reproduced with even higher detail accuracy, however, by the above-described process.

In a uniformly heavily printed scan field, it is more expedient to select the recording dots to be printed by random selection, by producing slight differences between the per se equally large tonal values of the scan dots. In this manner, the procedure of the above-described further form of embodiment of the process of the invention can be used to determine the position of the recording dots potentially to be printed.

In order to reduce the costs associated with the data management, the position of the recording elements to be printed as a function of the sums of the average values is determined within the same order subfields by a random selection. For this, the positions of recording dots potentially to be printed within same order subfields are determined differently and beforehand. This avoids repetitious (recording-)dot patterns in the reproduction of equal color areas.

Determination of the recording dots as a function of the magnitude of the tonal values of the individual scan elements is not performed hereby, resulting in lower required costs associated with storage of the positions of the recording dots potentially to be printed. As a result, the image can be recorded faster, although a slight loss of sharpness must be taken into account.

More expediently, the position of the recording elements to be reproduced as a function of the sums of the average values in the different order subfields is determined in such a way that each recording element is printed once. The position of the recording dots belonging to the respective subfields, which recording dots are printed as a function of the sum of the average tonal value of each subfield, is selected randomly within subfields of equal size. It is critical that, within higher order subfields, which are, in each case, composed of lower order smaller subfields, the position of the recording dots potentially to be printed be so determined that each recording dot is printed once at most, i.e., is not "addressed" more than once.

Advantageously, the position of the recording elements to be printed as a function of the magnitude of the average values is determined within the same order fields by a random selection, in the course of which the position of the recording elements to be printed as a function of the magnitude of the average values is determined in the different order subfields so that each recording element is printed once. The position of the recording elements belonging to the respective subfields, which recording elements are printed as a function of the magnitude of the average tonal value of each subfield, is selected randomly within subfields of equal size. It is critical that, within the higher order subfields, which are, in each case, composed of the lower order smaller subfields, the location of recording dots potentially to be printed be so fixed that each recording dot is printed once at most. The location pattern for the recording dots potentially to be printed, in the various size subfields, would thus yield by superimposition a fully toned field. This division of the same and different sizes as a function of the magnitude of the average tonal values of the individual subfields assures that each tonal value of the original is reproduced well-nigh exactly.

An advantageous development of the invention is one in which, for recording the original with a tonal value scale that is coarser than that of the original, the recording elements to be printed as a function of the average tonal values of the scan elements are printed only for those subfields in which the number of scan or recording elements is greater or equal to the number required to represent the original with the desired tonal value scale. If the tonal value scale in the reproduction does not have to be as fine as that of the original, then the subfields must be first examined from a specific minimum size onward as to whether there is a recording dot to print as a function of the average tonal value of the subfield. If, for example, instead of a tonal value scale comprising 256 steps, a tonal value scale comprising only 16 steps should be reproduced, only subfields (data blocks), which are at least as large as 16 scan or recording dots (which comprise at least 16 tonal value data) are considered for determining the number and location of the recording dots to be printed. Thus, the processing speed of the semihalftone image increases.

By these means, the process can be performed easily. In view of the established digital technique preferred for image processing, it is especially useful to undertake the subdivision of the scan field by digital value steps. This means to resolve the tonal value data for the scan dots of the scan field first into two equal size first blocks and then into two equal size second blocks (thus there are four data blocks of equal size) and so on. The subdivision into an equal number of equal size data blocks in each case is also advantageous for data management and assignment of data to the individual data blocks.

It is advantageous for the size of the smallest subfields of the original, that is, the number of tonal values collected into a smallest data block, to correspond to the ratio of recording detail to scan detail or recording definition to scan definition. The smallest subfields have the size of two recording dots, if the recording detail is, or is selected to be, greater than or equal to the scan detail. A relationship of "1" indicates that a recording dot in the reproduction corresponds to a scan dot of the original. A relationship of "2" would thus mean that a scan dot is represented by four recording dots. For those subfields that are smaller or the same size as a scan dot, the tonal value of the scan dot, in which the subfield lies, is taken as the average value. Thus, a special average value calculation is omitted. In the instance of a relationship of "2", the average values of two adjacent smallest subfields would be thus equal to the tonal value of the scan dot in which both smallest fields lie.

It can be most advantageous to record in more detail than in scanning. The lesser scan detail has the advantage in that, for adequate sharpness, less tonal value data is collected. The greater recording detail has the advantage in that the recorded image shows less graininess, which has a smoothing effect and can be viewed better. Altogether, fewer addition steps are needed for each matrix, as the average tonal values for those subfields that are smaller than or the same size as a scan dot do not require an average value calculation (calculation of sums). In the instance of a recording that is $\sqrt{2}$ more detailed than the scan and with the aid of the highest value bit of the digitized tonal value of each scan dot, which is reproduced by two recording dots and is equal to the size of the smallest subfield, it can be determined whether one of both recording dots is to be printed. Thus, in this case, about 50% fewer addition steps would be required per scan field. In the instance of a recording with twice the definition of the scan, 75% of the addition steps are eliminated per scan field; with the aid of the highest value bits of the digitalized tonal value of a scan dot, it can be determined whether a recording dot in a smallest subfield is to be printed, while, with the aid of the second highest bit of the digitized tonal value, it can be determined whether a recording dot in the next larger subfield is to be printed.

The scan and recording dots are advantageously arranged in an orthogonal matrix. With such an arrangement of the scan dots, the scan field can be subdivided very easily into individual subfields, so that the individual scan dots can be assigned very easily to the individual subfields. This also permits an easy assignment of the individual tonal value data to the various and different size data blocks, such that the data management is simplified.

The scan and recording dots respectively are arranged preferably in a hexagonal fashion. In this arrangement of the scan or recording dots, one scan or recording dot shows six so-called nearest neighboring dots, that is, the scan or recording dots of a series are arranged "gapwise" between the scan or recording dots of the neighboring series. The rows or columns of such a matrix are therefore shifted alternately with respect to one another. In this type of arrangement, the original can be scanned much more accurately on the one hand; on the other, the image can be recorded much more accurately, because the size of the interstices is minimized between the individual scan or recording dots, which show respectively a circular surface. This hexagonal arrangement is especially advantageous for small scan and recording dots.

The process of the invention can be used not only for the recording of monochromatic semihalftone images, but also for the recording of polychromatic semihalftone images, which are composed of several additive or subtractive basic colors. For the latter purpose, the above-described process is performed for each of the basic colors and the resulting monochromatic semihalftone images are superimposed. For each additive or subtractive basic color, a specific tonal value is assigned on scanning to each scan dot. In the following subdivision of a scan field, the average tonal value of the pertinent basic color of the resulting subfield is measured or calculated in the above-described manner. The individual recording dots can be either toned fully with the corresponding additive or subtractive basic color or not toned at all. In polychromatic image recording with the aid of this process, the known methods of avoiding moire effects can also be used.

The process can also be applied to recording three dimensional originals. In this variation, an original is reproduced three dimensionally on a recording medium by individual recording volume elements with the tone value "print" or "no-print", the original is subdivided into a number of scan volumes consisting of individual scan volume elements and each scan volume is subdivided successively into the smallest subvolumes with a given volume.

In the recording of three dimensional originals as semihalftone images, the invention provides that, for each smallest subvolume, as well as for each of the next higher order subvolumes to which the pertinent subvolume belongs, the average value is determined or estimated form the tonal values of the scan volume elements located in the subvolume being considered. Further, at least one of the recording volume elements, which are assigned to the subvolume then being considered, is reproduced with the color value "print", if the average value is greater than a given reference value.

The above-described extensions or variations of the invention also apply similarly to the instance of recording holographic images. The considerations made in connection with the extensions must be transferred in a three dimensional scope.

For recording holographic images, the scan and recording volume elements respectively can be arranged in either an orthogonal three dimensional matrix or in a three dimensional matrix with the most dense hexagonal close packing. While the first possibility permits a simple, obvious subdivision of the three dimensional original into the first, second, third and so on volumes, the second possibility offers the advantage that the three dimensional original can be reproduced by the arrangement of the scan or recording elements with less information loss; in the most dense hexagonal close packing, the size of the interstices between the individual volume elements is at a minimum.

Further, the invention involves as apparatus for conversion of image dot tonal values with a processing unit, which translates the tonal values of an original, subdivided into multiple scan fields, into recording image dot data, which corresponds to the tone value of either "print" or "no-print".

This apparatus is characterized, in accordance with the invention, an input switching network, which contains the image dot tonal value data and integrates the data into a subdivision of the scan fields of the original into subfields corresponding to image dot tonal value data blocks, an arithmetic processor connected to the input switching network, which processor determines or estimates the average tonal values from the image dot tonal value data of each block and emits an output signal for each block if the average tonal value of the block is greater than a given reference value, and an output switching network connected to the output of the arithmetic processor, which network plots the recording image dot data, or the distribution of the recording image dot data corresponding to the tonal value "print" and the tonal value "no-print", as a function of the output signals of the arithmetic processor.

All image dot tonal value data for a scan field queue up in the input circuits of the input switching network. The sequence in which the image dot tonal value data fit in the input circuits is transposed in the input switching network, so that the tonal value data collected into the smallest data block, the smallest data block collected into the higher order data blocks and so on, fit in the output circuits of the input switching network. Thus, a reorganization of the tonal value data in the individual data blocks takes place in the input switching network. This reorganization corresponds to the subdivision of the scan fields into the smallest subfields and into the higher order subfields of various sizes. The outputs of the input switching network are connected with the inputs of an arithmetic processor, which determines or estimates the average tonal values for the pertinent data blocks from the individual tonal value data. The arithmetic processor produces for each data block a binary output signal, which, for example, is "high", if the average tonal value is greater than a given reference value, and is "low", if the average tonal value is smaller than or equal to the given reference value. Thus, the arithmetic processor receives the tonal value of each scan dot of a scan field in the form of a binary coded signal and produces a binary output signal for each data block, that is, for each smallest data block, for each next larger data block assembled from the smallest data blocks and so on. The output signals of the arithmetic processor are sent as input signals into the input switching network. The output switching network determines, with the aid of its input signals, which recording dot per subfield is printed, if the output signal of the arithmetic processor is "high" for the data block corresponding to the subfield. The output switching network produces for each recording dot a binary signal, which is either "high" (for example, for a dot to be printed) or "low" (for a no-print). The processing device of the invention for image dot tonal value data thus transforms the binary coded tonal value of the individual scan dots of a scan field into binary signals, which can assume either the "high" or "low" state and indicate whether a recording dot is to be toned or not. The entire processing takes place digitally and can be executed parallelwise, therefore, very quickly.

In an advantageous development of the invention, the arithmetic processor has a multistage network of interconnected adders with transfer output, so that, in the lowest stage, as many adders are provided as there are smallest data blocks and each adder of the lowest stage adds the tonal value data of the image dot belonging to a smallest data block. The output of the adders of one stage are connected with the inputs of the adders of the next higher stage, while the transposition outputs of the adders of each stage are the outputs of the arithmetic processor. Thus, the arithmetic processor is effectuated as a multistage network of adders with transfer output. The transfer outputs of the adders of one stage represent the outputs of the arithmetic processor of the corresponding data blocks. The transfer outputs of the adders of the lowest stage, which add respectively the tonal value data of the smallest data blocks, are the outputs for the smallest data blocks. The entire arithmetic processor is simple to build and consists of commercial parts, which make it economical to construct.

It is advantageous for the input and output switching networks to be controlled by a programmable control unit. The input switching network is controlled so that the image dot tonal value data are switched from the inputs of the input switching network, corresponding to the subdivision into data blocks, to the outputs of the input switching network. In addition, the control unit also directs the switching of the input signals in the output switching network to its output circuits.

In a preferred form of the invention, the method of compiling the image dot tonal value data into data blocks and the method of distributing the recording image dots are stored in a storage unit connected with the control unit, so that several different compilation and distribution patterns are stored in the storage unit. At least one control pattern is thus stored in the storage unit for the input switching network and the output switching network. If more of such control patterns are stored for both networks, the subdivision of the tonal value data of a scan field into data blocks on the one hand and one the other hand, the distribution of the recording dots to be printed per data block can be varied from scan field to scan field.

An advantageous development of the invention provides that the image dot tonal value data of a scan field, which consists of image dots arranged in a matrix with $2^n$ rows and $2^n$ columns, fit on the inputs of the input switching network, whereby n is a natural number and the tonal values of the image dots are available as binary numbers with 2n places, and that the adders of the arithmetic processor are digital adders for the addition of 2n-place binary numbers. If a digitally expressed number of scan dots is compiled into one scan field, that is, a digitally expressed number of image dot tonal value data are compiled into a (principal) data block and transmitted to the input switching network, there results in the arithmetic processor a particularly simple estimate of the magnitude of the average value of the tonal value data belonging to the smallest data block in each case. The average value can be estimated with the aid of the highest value bit at the output of the digital adder, that is, with the aid of the transfer bits of the digital adder. An actual average value calculation is, therefore, not required. This saves calculation time.

The number of transfer outputs of each adder corresponds to the number of image dot tonal values data per smallest data block or the number of smaller data blocks belonging to a larger data block.

It is advantageous for the arithmetic processor to be of a controllable type such that if the recording definition is greater than the scan definition, the input circuits of the arithmetic processor for the image dot tonal value data can be connected with the inputs of the adders of higher stages; in addition, the input circuits of the arithmetic processor for the highest value bits of the image dot tonal value data can be connected with the outputs of the arithmetic processor. If the recording definition is greater than the scan definition, the average value calculation for the smallest or smaller data blocks can be replaced by trying the highest value bits of the image dot tonal value data of the smallest or smaller data blocks. The highest value bits are applied directly to the outputs of the arithmetic processor for the pertinent data blocks.

In the case of recording definition $\sqrt{2}$ greater than scan definition, the input circuits of the arithmetic processor for the image dot tonal value data are connected with the inputs of the adders of the second stage; in addition, the input circuit of the arithmetic processor for the highest value bit of the image dot tonal value data is connected with the outputs of the arithmetic processor. In the case of recording definition twice as great as scan definition, the input circuits of the arithmetic processor for the image dot tonal value data are connected with the inputs of the adders of the third stage, the input circuits of the arithmetic processor for the respective highest value bits are connected with the outputs of the arithmetic processor for the smallest data blocks and the input circuits of the arithmetic processor for the second highest value bits are connected with the outputs of the arithmetic processor for the data blocks superimposed on the smallest data blocks.

The smallest data blocks, into which the input signals of the input switching network are compiled, comprise respectively two tonal value data, if the recording definition is greater than or equal to the scan definition. The input switching network is controlled so that each input of the input switching network for a tonal value data signal is connected with a number of outputs of the input switching network corresponding to the ratio or recording-to-scan definition. When the ratio of recording-to-scan definition is varied, it is not necessary, as in the above versions, for the arithmetic processor to be switched; the switching occurs much more in the input switching network and such that the tonal value data signals to be processed per data block are correctly grouped into the inputs of the arithmetic processor.

At a ratio of $\sqrt{2}$, one input of the input switching network, to which a tonal value data signal is sent, is connected with two outputs of the output switching network. These two output signals represent the tonal value data for a smallest data block. At a ratio of "2", one input of the input switching network, to which a tonal value data signal is sent, is connected with four outputs of the input switching network. These four output signals correspond to two smallest data blocks with respectively two tonal value data. By corresponding control of the input switching network, the binary coded tonal value data of the scan dots of the original can be converted for each ration of recording-to-scan definition into the appropriate binary signals, which can assume only the "high" or "low" state.

We claim:

1. Apparatus for reproducing a continuous tone original image on a recording medium using a plurality of recording elements with a tonal value of "print" (or "on") or "no-print" (or "off"), characterized in that the apparatus consists of:

an input switching network adapted to receive image dot tonal value data representative of the original image and to compile the data into data blocks corresponding to a subdivision of scan fields of the original into a plurality of subfields, the subfields comprising individual scan elements, each of the scan fields being subdivided successively into higher order subfields and then into smallest subfields of a predetermined size equal to at least two of the recording elements, the scan fields and the subfields selected such that for each one of the smallest subfields and for each of the successively higher order subfields to which the smallest subfield belongs there is at least one, once only selected, preselected recording element which can be turned "on" or "off", an arithmetic processor connected with the input switching network to receive the data blocks, the processor adapted to emit an output signal for each one of the blocks when an average tonal value determined for each one of the smallest subfields and for each of the higher order subfields from the tonal values of the scan elements in the subfields considered is greater than a predetermined reference value, and an output switching network connected with the arithmetic processor, the output switching network adapted to plot the recording image dot data or the distribution of the recording image dot data corresponding to the tonal value "print" and to the tonal value "no-print" as a function of the output signals of the arithmetic processor.

2. Apparatus in accordance with claim 1, characterized in that the input switching network has inputs for receiving the image dot tonal value data and outputs for emitting the data blocks; there is provided a control unit for controlling the input switching network in a manner such that the input switching network inputs connected with the input switching network outputs; the output switching network has inputs and outputs; and the control unit controls the output switching network in such a manner that the output switching network inputs are connected, respectively, with the output switching network outputs to which are directed the data for the recording image dots with the tonal value "print".

3. Apparatus in accordance with claim 2, characterized in that there is provided a storage device connected with the control unit, the storage device for storing the type of the compilation of the image dot tonal value data and the type of the distribution of the recording image dots.

4. Apparatus in accordance with claim 3, characterized in that a number of different compilation and distribution patterns can be stored in the storage device.

5. Apparatus in accordance with claim 2, characterized in that there are provided a data input storage device controlled by the control unit, the storage device for storing temporarily the image dot tonal value data of the original for transmitting the tonal value data scan field by scan field to the input switching network, and a data output storage device controlled by the control unit, the output storage device for storing the recording image dot data issued per scan field from the output switching network.

6. Apparatus for the conversion of image dot tonal values with processing unit, which converts tonal values of an original, which is subdivided into multiple scan fields, into recording image dot data, which corresponds to a tonal value of "print" or "no-print", characterized in that the processing unit consists of:

an input switching network adapted to receive image dot tonal value data and to compile the data into data blocks corresponding to a subdivision of scan fields of the original into subfields, an arithmetic processor connected with the input switching network, the processor adapted to emit an output signal for each one of the blocks when an average tonal value of the block is greater than a predetermined reference value, characterized in that the arithmetic processor has a multistage network of interconnected adders with inputs and transfer outputs, such that there are as many adders in a lowest first stage as there are smallest data blocks and each of the adders of the lowest state adds the tonal value data of the image dots of a smallest data block, and in that the outputs of the adders of one of the stags are connected with the inputs of the adders of the next higher stage and the transfer outputs of the adders are outputs of the arithmetic processor, and an output switching network connected with the arithmetic processor, the output switching network adapted to plot the recording image dot data or the distribution of the recording image dot data corresponding to the tonal value "print" and to the tonal value "no-print" as a function of the output signals of the arithmetic processor.

7. Apparatus in accordance with claim 6, characterized in that the image dot tonal value data of a scan field comprises image dots arranged in a matrix with $2^n$ rows and $2^n$ columns and are directed to inputs of the input switching network, n being a natural number, and the tonal values of the image dots being present as binary numbers with 2n places, and in that the adders of the arithmetic processor are digital adders for adding 2n place binary numbers.

8. Apparatus in accordance with claim 7, characterized in that, if a recording definition is greater than a scan definition, input circuits of the arithmetic processor for the image dot tonal value data can be connected with the inputs of the adders of one of the higher stages, and, in addition, the input circuits of the arithmetic processor for the highest value bits of the image dot tonal value data can be connected with the outputs of the arithmetic processor.

9. Apparatus in accordance with claim 8, characterized in that, for a recording definition twice as great as a scan definition, the input circuits of the arithmetic processor for the image dot tonal value data can be connected with the inputs of the adders of the higher third stage, the input circuits of the arithmetic processor for the respective highest value bits can be connected with the outputs of the arithmetic processor for the smallest data blocks, and the input circuits of the arithmetic processor for the respective second highest bits can be connected with the outputs of the arithmetic processor for the data blocks of higher order than the smallest data blocks.

10. Apparatus in accordance with claim 8, characterized in that, for a recording definition $\sqrt{2}$ times greater than a scan definition, the input circuits for the arithmetic processor for the image dot tonal value data can be connected with the inputs of the adders of the higher second stage and, in addition, the input circuits of the arithmetic processor for the respective highest value bits of the image dot tonal value data can be connected with the outputs of the arithmetic processor.

11. Apparatus in accordance with claim 7, characterized in that the number of transfer outputs of each of the adders corresponds to the number of image dot tonal value data per smallest data block or the number of lower order data blocks belonging to a higher order data block.

12. Apparatus in accordance with claim 11, characterized in that the smallest data blocks comprise two tonal value data, if the recording definition is greater than or equal to the scan definition.

13. Apparatus in accordance with claim 12, characterized in that the control unit controls the input switching network in a manner such that each of the input switching network inputs for a tonal value data signal is connected with a number of the input switching network outputs corresponding to the ratio of recording definition to scan definition.

14. Apparatus in accordance with claim 13, characterized in that, at a ratio of $\sqrt{2}$, one of the input switching network inputs for a tonal value data signal is connected with two of the input switching network outputs.

15. Apparatus in accordance with claim 13, characterized in that, at a ratio of two, one of the input switching network inputs for a tonal value data signal is connected with four of the input switching network outputs.

* * * * *